(12) United States Patent
Guo et al.

(10) Patent No.: US 11,306,899 B2
(45) Date of Patent: Apr. 19, 2022

(54) LIGHT SOURCE SYSTEM AND DISPLAY DEVICE

(71) Applicant: APPOTRONICS CORPORATION LIMITED, Shenzhen (CN)

(72) Inventors: Zuqiang Guo, Guangdong (CN); Peng Du, Guangdong (CN); Yi Li, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 195 days.

(21) Appl. No.: 16/614,105

(22) PCT Filed: Aug. 9, 2017

(86) PCT No.: PCT/CN2017/096514
§ 371 (c)(1),
(2) Date: Mar. 17, 2020

(87) PCT Pub. No.: WO2018/214289
PCT Pub. Date: Nov. 29, 2018

(65) Prior Publication Data
US 2020/0271300 A1 Aug. 27, 2020

(30) Foreign Application Priority Data
May 26, 2017 (CN) .......................... 201710385424.8

(51) Int. Cl.
*F21V 9/32* (2018.01)
*F21V 5/04* (2006.01)
(Continued)

(52) U.S. Cl.
CPC .................. *F21V 9/32* (2018.02); *F21V 5/04* (2013.01); *F21V 7/0033* (2013.01); *F21V 7/04* (2013.01);
(Continued)

(58) Field of Classification Search
CPC ..... F21V 9/32; F21V 9/06; F21V 5/04; F21V 7/0033; F21V 7/04; F21V 13/04;
(Continued)

(56) References Cited

U.S. PATENT DOCUMENTS

2006/0170873 A1 8/2006 Kato
2015/0267880 A1* 9/2015 Hadrath ............... G03B 21/204
362/84

FOREIGN PATENT DOCUMENTS

CN 102033397 A 4/2011
CN 104820334 A 8/2015
(Continued)

OTHER PUBLICATIONS

International Search Report for International Application No. PCT/CN2017/096514, dated Feb. 24, 2018.
(Continued)

*Primary Examiner* — Joseph L Williams
*Assistant Examiner* — Jose M Diaz
(74) *Attorney, Agent, or Firm* — Marshall, Gerstein & Borun LLP

(57) ABSTRACT

A light source system includes an exciting light source, a collection system, a wavelength conversion device, a relay system, an optical-mechanical system, a detection device, and a distance adjustment device. The exciting light source emits exciting light. The conversion region converts the exciting light into excited light. Optical axes of the excited light and the exciting light that are emitted from the wavelength conversion device do not coincide with each other. The excited light and exciting light collected by the collection system are guided to the optical-mechanical system via the relay system. The detection device detects information on brightness and/or color coordinates of the light emitted from the optical-mechanical system. The distance adjust-
(Continued)

ment device adjusts a distance between the collection system and the wavelength conversion device in such a manner that the brightness and/or color coordinates of the light emitted from the optical-mechanical system meet a preset condition.

23 Claims, 14 Drawing Sheets

(51) Int. Cl.
    *F21V 7/00*     (2006.01)
    *F21V 7/04*     (2006.01)
    *F21V 9/06*     (2018.01)
    *F21V 13/04*     (2006.01)
    *F21V 23/04*     (2006.01)

(52) U.S. Cl.
    CPC ................ *F21V 9/06* (2013.01); *F21V 13/04* (2013.01); *F21V 23/0457* (2013.01)

(58) Field of Classification Search
    CPC ............ F21V 23/0457; G03B 21/2046; G03B 21/2066; G03B 21/204; G03B 21/14; G03B 33/08
    See application file for complete search history.

(56) References Cited

FOREIGN PATENT DOCUMENTS

| | | |
|---|---|---|
| CN | 105676576 A | 6/2016 |
| CN | 205539893 U | 8/2016 |
| CN | 205982968 U | 2/2017 |

OTHER PUBLICATIONS

First Office Action issued to Application No. CN 201710385424.8, The State Intellectual Property Office of People's Republic of China, dated Feb. 3, 2020.

Second Office Action issued to Application No. CN 201710385424.8, The State Intellectual Property Office of People's Republic of China, dated Sep. 30, 2020.

* cited by examiner (A)

(B)

(C)

(D)

LIGHT SOURCE SYSTEM AND DISPLAY DEVICE

CROSS-REFERENCE TO RELATED APPLICATION

This is the United States national phase of International Patent Application PCT/CN2017/096514, filed Aug. 9, 2017, which claims priority to Chinese Application No. 201710385424.8, filed May 26, 2017. The entirety of each of the foregoing applications are hereby incorporated by reference.

TECHNICAL FIELD

The present disclosure relates to a light source system and a display device.

BACKGROUND

At present, laser light sources are becoming more and more widely used in display (such as a projection field) and illumination technologies. Due to advantages of a high energy density and a small etendue, the laser light sources have gradually replaced bulbs and LED sources in the field of high-brightness light sources. Moreover, a light source system, which uses a first light source to excite excited light powder to generate desired light (for example, blue laser light excites yellow excited light powder to generate white light or light of a specific color), has become mainstream of application due to its advantages such as high luminous efficiency, good stability, low cost and so on.

Referring to FIG. 1 and FIG. 2, FIG. 1 is a structural schematic diagram of a light source system 100 in the related art, and FIG. 2 is a structural schematic diagram of a region light-splitting sheet 103 of the light source system 100 shown in FIG. 1. The light source system includes an exciting light source 101, a light homogenizing device 102, a region light-splitting sheet 103, a collection system 104, a wavelength conversion device 105, relay lenses 106 and 108, a mirror 107, and an optical-mechanical square rod 109.

The exciting light source 101 is generally a blue laser light source that emits blue exciting light. After the blue exciting light is homogenized by the light homogenizing device 102, it passes through the region light-splitting sheet 103. As shown in FIG. 2, a center of the region light-splitting sheet 103 is a blue-transmitting and yellow-reflecting regional coating, and a mirror is in periphery of the center. The blue exciting light is transmitted through the regional coating of the region light-splitting sheet 103, is converged on the wavelength conversion device 105 via the collection system 104 (such as a collection lens), and excites the wavelength conversion device 105 to generate excited light (such as red excited light, green excited light, or yellow excited light). The excited light and a portion of the unconverted blue exciting light are emitted in a form of Lambertian light and reflected at the region light-splitting sheet 103 after being collected by the collection system 104. However, the portion of the blue exciting light is lost due to being transmitted at the regional coating, resulting in a low light utilization rate of the light source system 100.

In addition, the blue exciting light and the excited light that are reflected by the region light-splitting sheet 103 sequentially pass through the relay lens 106, the mirror 107, and the relay lens 108 to be imaged to an entrance of the optical-mechanical square rod 109 and are finally emitted from an exit of the optical-mechanical square rod 109. However, in the light beam incident on the optical-mechanical square rod 109, a central portion of the light beam lacks blue exciting light due to loss of the exciting light at the regional coating, resulting in that the central portion of the light emitted from the exit of the optical-mechanical square rod 109 is yellowed, that is, there is a phenomenon of uneven color.

In summary, in the existing light source system 100, the exciting light (i.e., the blue light) has a relatively low light utilization rate due to the loss at the regional coating, and the loss at the regional coating also affects uniformity of the light emitted by the light source system 100.

SUMMARY

In view of the above technical problems, there is a need to provide a light source system and a display device which can improve the above problems.

A light source system, including an exciting light source, a collection system, a wavelength conversion device, a relay system, an optical-mechanical system, a detection device, and a distance adjustment device, wherein:

the exciting light source is configured to emit exciting light;

the collection system is disposed between the exciting light source and the wavelength conversion device; and the exciting light irradiates the wavelength conversion device after being collected by the collection system;

the wavelength conversion device includes a conversion region and a reflective region, and the wavelength conversion device periodically moves in such a manner that the conversion region and the reflective region are periodically located on an optical path of the exciting light in time division; the conversion region is configured to convert the exciting light into excited light and emit the exited light, and the reflective region is configured to reflect the exciting light and then emit the exciting light; the excited light and the exciting light that are emitted from the wavelength conversion device are located on a same side of the wavelength conversion device but have optical axes that do not coincide;

the collection system is further configured to collect the excited light and the exciting light that are emitted from the wavelength conversion device;

the relay system is configured to guide the collected excited light and exciting light to the optical-mechanical system in such a manner that the excited light and the exciting light enter the optical-mechanical system with their optical axes being substantially coincident within a preset error range;

the optical-mechanical system is configured to homogenize and provide the excited light and the exciting light to a spatial light modulator for modulating image light;

when a distance between the collection system and the wavelength conversion device changes, brightness and color coordinates of light emitted from the optical-mechanical system change;

the detection device is configured to detect information on the brightness and/or the color coordinates of the light emitted from the optical-mechanical system; and the distance adjustment device is configured to adjust the distance between the collection system and the wavelength conversion device in accordance with the information detected by the detection device in such a manner that the brightness and/or the color coordinates of the light emitted from the optical-mechanical system satisfy a preset condition.

Compared with the related art, in the light source system and the display device, the excited light and the exciting light that are emitted from the wavelength conversion device are located on the same side of the wavelength conversion device, but their optical axes do not coincide. That is, the optical path of the exciting light shifts with respect to an incidence optical path after being reflected by the reflective region, such that the region of the region light-splitting device to which the exciting light returns from the wavelength conversion device is different from the incidence region of the exciting light, thereby avoiding loss generated by the incidence region without adding additional elements, improving the light utilization rate of the light source system, and reducing unevenness of the emitted light caused by the loss at the regional coating.

Further, the light source system and the display device further include a detection device and a distance adjustment device, and the detection device is used to detect information on brightness and/or color coordinates of the light emitted by the optical-mechanical system; the distance adjustment device is used to adjust a distance between the collection system and the wavelength conversion device in accordance with the information detected by the detection device, such that the brightness and/or the color coordinates of the light emitted by the optical-mechanical system meet preset conditions, and the brightness and/or the color coordinates of the light source system and the display device more satisfy needs of users, resulting in the better user experience.

DESCRIPTION OF MAIN COMPONENTS' REFERENCE NUMBERS

Figure 1:
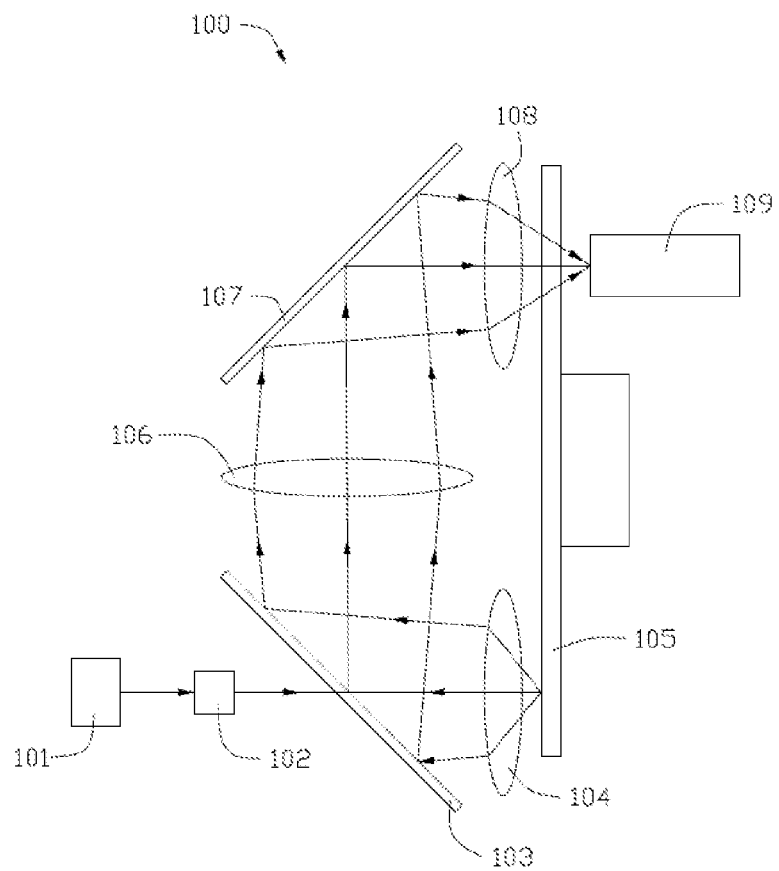
FIG. 1 is a structural schematic diagram of a light source system in the related art.
Figure 2:
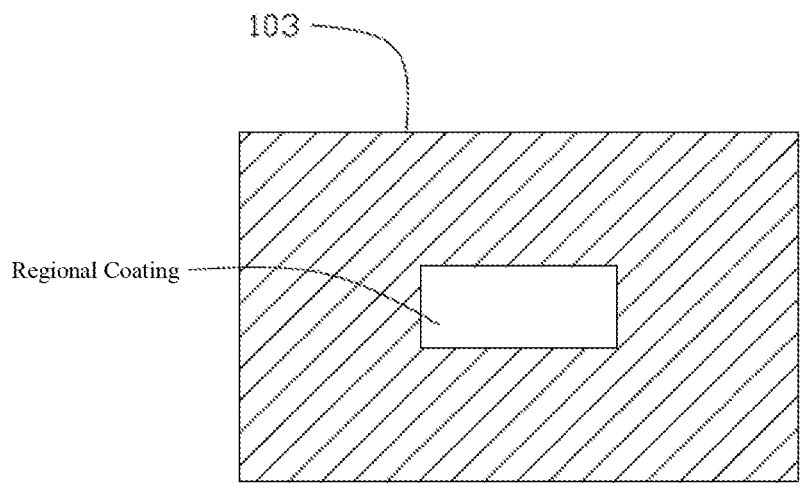
FIG. 2 is a structural schematic diagram of a region light-splitting sheet of the light source system shown in FIG. 1.
Figure 3:
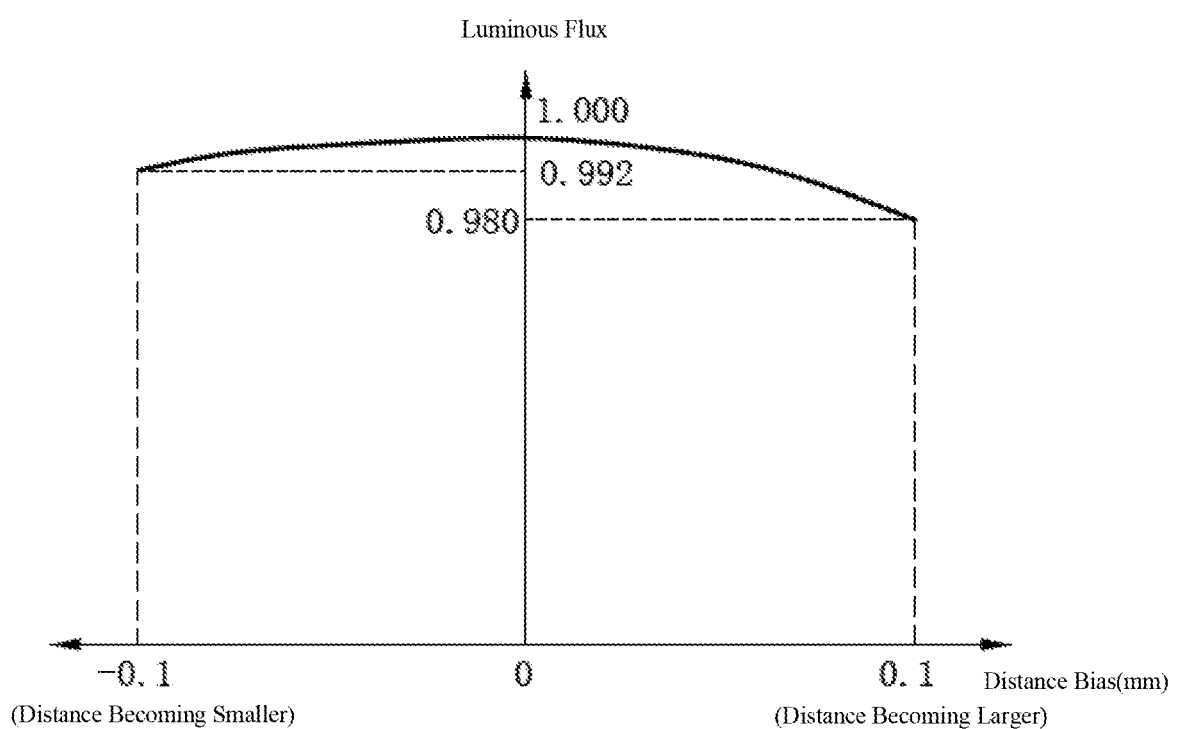
FIG. 3 illustrates a curve showing influence of change in a distance between a collection system and a wavelength conversion device of the light source system shown in FIG. 1 on luminous flux of the light source system.

Light source system 200, 200', 300, 400, 500, 600, 700,
Exciting light source 201, 501
Wavelength conversion device 207, 407, 707
Relay system 203
Light homogenizing device 204
Region light-splitting device 205, 305, 405, 505, 705
Guiding device 212, 512, 612
Scattering device 210, 710
Optical-mechanical system 230,730
Collection system 206a, 406a
Relay lens 206b, 206c, 234, 235, 706c
First region 205a, 505a
Second region 205b, 505b
Reflective region 215
Conversion region 214
Scattering region 217
Filtering region 218
Light exiting channel 216, 316, 416, 716
Light-splitting sheet 205c, 305c, 405c, 508, 608, 705c
Mirror 205d, 305d, 405d, 509, 609, 705d
First light exiting channel 216a, 516a, 616a
Second light exiting channel 216b, 516b, 616b
Distance adjustment device 202
Light source controller 250
Spatial light modulator 240
Optical-mechanical system 230
First stop 231
Second stop 232
Third stop 233
Detection device 260

The present disclosure will be further illustrated by the following detailed description in conjunction with the accompanying drawings.

DESCRIPTION OF EMBODIMENTS

Figure 4:
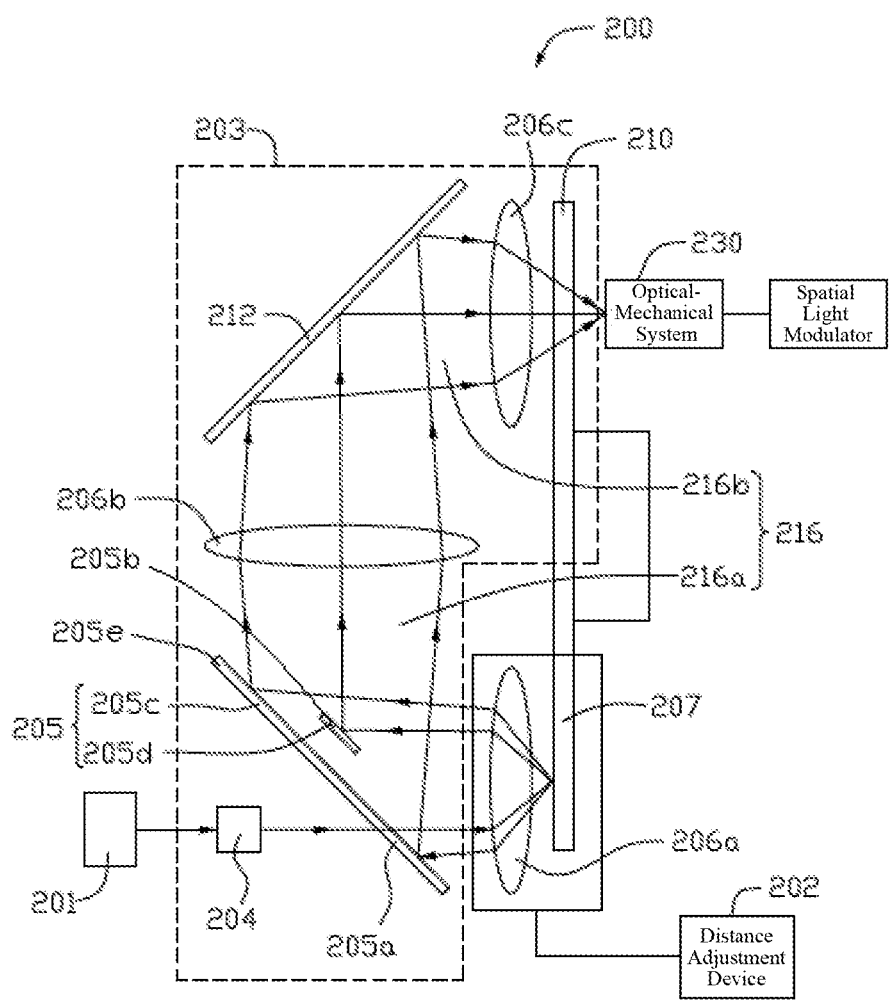
FIG. 4 is a structural schematic diagram of a light source system according to a first embodiment of the present disclosure.

Referring to FIG. 4, FIG. 4 is a structural schematic diagram of a light source system 200 according to a first embodiment of the present disclosure. The light source system 200 includes an exciting light source 201, a collection system 206a, a wavelength conversion device 207, a relay system 203, an optical-mechanical system 230, and a distance adjustment device 202.

The exciting light source 201 is configured to emit exciting light. The collection system 206a is disposed between the exciting light source 201 and the wavelength conversion device 207. The exciting light is collected by the collection system 206a and then irradiates the wavelength conversion device 207. The wavelength conversion device 207 includes a conversion region 214 and a reflective region 215, and periodically moves in such a manner that the conversion region 214 and the reflective region 215 are periodically located on an optical path of the exciting light in different time divisions. The conversion region 214 is configured to convert the exciting light into excited light and emit the excited light, and the reflective region 215 is configured to emit the exciting light by reflection; the excited light and the exciting light that are emitted from the wavelength conversion device 207 are located on the same side of the wavelength conversion device 207 but their optical axes do not coincide. The collection system 206a is further configured to collect the excited light and the exciting light that are emitted from the wavelength conversion device 207. The relay system 203 is configured to guide the collected excited light and exciting light to the optical-mechanical system 230 in such a manner that the excited light and the exciting light enter the optical-mechanical system 230 with their optical axes being substantially coincident within a preset error range. The optical-mechanical system 230 is configured to homogenize the excited light and the exciting light and provide them to a spatial light modulator for modulating image light. As a distance between the collection system 206a and the wavelength conversion device 207 changes, brightness and color coordinates of the light emitted from the optical-mechanical system 230 change. The distance adjustment device 202 is configured to adjust the distance between the collection system 206a and the wavelength conversion device 207 in such a manner that the brightness and/or the color coordinates of the light emitted from the optical-mechanical system 230 satisfy a preset condition.

Specifically, the exciting light source 201 is configured to emit the exciting light, and can be a semiconductor diode or a semiconductor diode array. The semiconductor diode array can be laser diodes (LDs) or the like. The exciting light can be blue light, purple light or ultraviolet light, etc., but the present disclosure is not limited thereto. In the present embodiment, the exciting light source 201 is a blue light semiconductor laser diode for emitting blue laser light as the exciting light.

The relay system 203 includes a light homogenizing device 204, a region light-splitting device 205, a guiding device 213, a scattering device 210, a first relay lens 206b, and a second relay lens 206c. The light homogenizing device 204 is located on the optical path of the exciting light emitted by the exciting light source 201, and is configured to homogenize the exciting light emitted by the exciting light source 201. It will be appreciated that in a modified embodiment, the light homogenizing device 204 can be omitted.

The region light-splitting device 205 includes a first region 205a, a second region 205b, and a third region 205e located at periphery of the first region 205a and the second region 205b. The first region 205a is located on the optical path of the exciting light emitted by the light homogenizing device 204. The first region 205a of the region light-splitting device 205 guides (e.g., transmits) the exciting light to the wavelength conversion device 207, and the exciting light is obliquely incident to the wavelength conversion device 207 at a preset angle (e.g., an incident angle of 30 degrees). The second region 205b of the region light-splitting device 205 is configured to guide the exciting light reflected by the wavelength conversion device 207 to a light exiting channel.

The first region 205a and the second region 205b may both be rectangular regions and are independent of each other. The third region 205e is a rectangular region having two rectangular notches corresponding to the first region 205a and the second region 205b.

Figure 5:
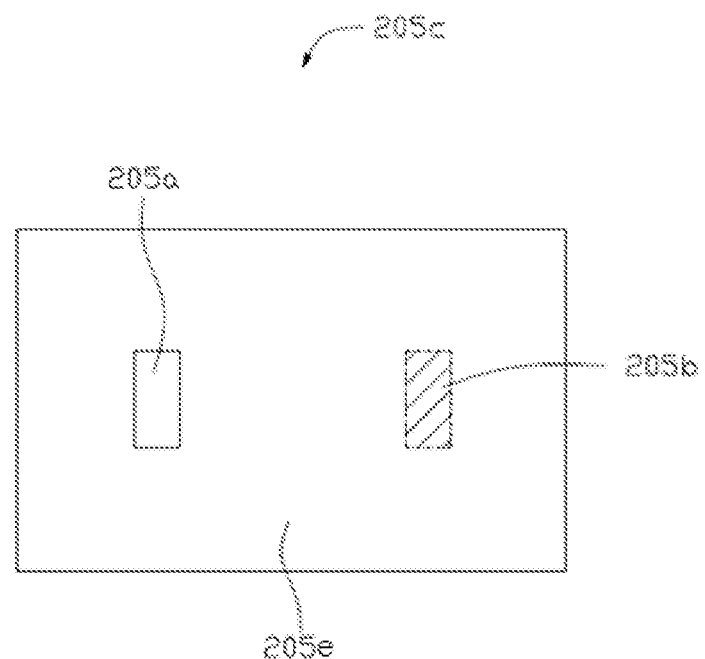
FIG. 5 is a structural schematic diagram of a light-splitting sheet of the light source system shown in FIG. 4.

Specifically, the region light-splitting device 205 can include a light-splitting sheet 205c (such as a dichroic color sheet) and a mirror 205d. The light-splitting sheet 205c and the mirror 205d are parallel with each other and are disposed at substantially 45 degrees with respect to a direction of the exciting light. Referring to FIG. 5, FIG. 5 is a structural schematic diagram of the light-splitting sheet 205c. In the plane, the light-splitting sheet 205c may be substantially rectangular. The light-splitting sheet 205c is disposed correspondingly to the first region 205a, the second region 205b, and the third region 205e. That is, the light-splitting sheet 205c covers the first region 205a, the second region 205b, and the third region 205e. The mirror 205d is disposed correspondingly to the second region 205b, and the mirror 205d of the second region 205b reflects a first portion of the exciting light to the light exiting channel.

Specifically, when being viewed from a direction perpendicular to the light-splitting sheet 205c, the third region 205e may be located at the periphery of the first region 205a and the second region 205b. Specifically, the first region 205a may be located at a side of the light-splitting sheet 205c, substantially at a central position between a center of the light-splitting sheet 205c and one side edge (a lower side edge) of the light-splitting sheet 205c.

The light-splitting sheet 205c at the first region 205a is a coated region that can transmit the exciting light. The light-splitting sheet 205c at the first region 205a may also reflect other light having a wavelength longer than that of the exciting light, such as red light, green light, or yellow light. The light distribution sheets 205c at the second region 205b and the third region 205e (i.e., the region other than the first region 205a) is a coated region that can reflect the exciting light and the other light (such as red light, green light, and yellow light).

The collection system 206a is located between the region light-splitting device 205 and the wavelength conversion device 207, for converging and collecting light between the region light-splitting device 205 and the wavelength conversion device 207. Specifically, the collection system 206a can include a collection lens, such as a convex lens. The collection system 206a can be adjacent to the wavelength conversion device 207, and an optical path of the exciting light emitted by the first region 205a is parallel with an optical axis of the collection system 206a but there is a preset distance therebetween, such that after the collection system 206a collects the exciting light, the exciting light is incident on the wavelength conversion device 207 at the preset angle.

Figure 6:
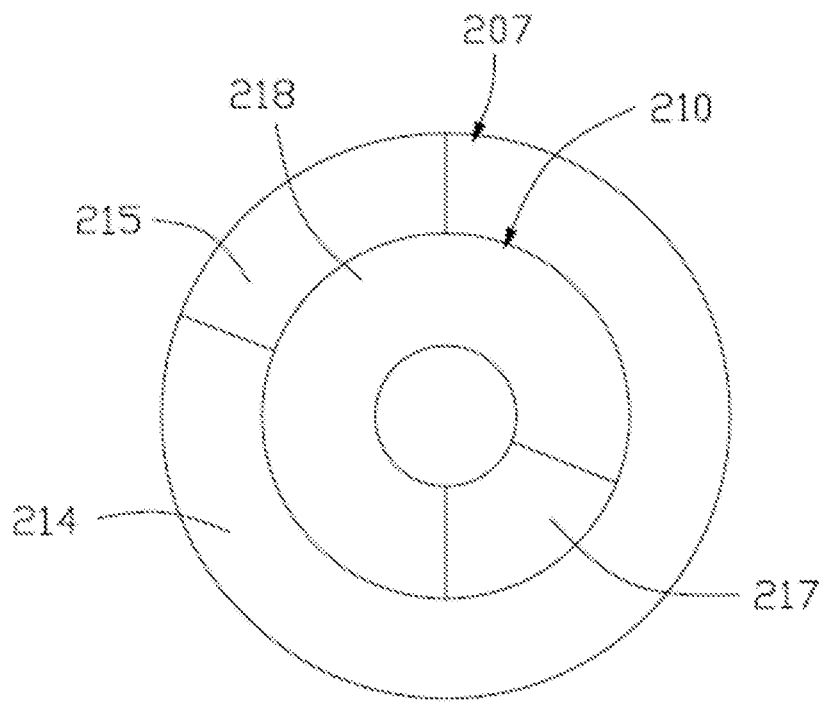
FIG. 6 is a structural schematic diagram of a wavelength conversion device and a scattering device of the light source system shown in FIG. 4.

Referring to FIG. 6, FIG. 6 is a structural schematic diagram of the wavelength conversion device 207 and the scattering device 210 of the light source system 200 shown in FIG. 4. The reflective region 215 and the conversion region 214 may be segmented regions sequentially arranged in a circumferential direction. When the light source system 200 is in operation, the wavelength conversion device 207 rotates in the circumferential direction, in such a manner that the reflective region 215 and the conversion region 214 are sequentially located on the optical path where the exciting light emitted by the collection system 206a is located. The exciting light transmitted by the first region 205a may be obliquely incident to the reflective region 215 and the conversion region 214 at a preset angle (e.g., a relatively small angle of 30 degrees). When the exciting light is divided according to the different regions to which it is incident, the exciting light includes a first portion of the exciting light incident to the reflective region 215 and a second portion of the exciting light incident to the conversion region 214.

The reflective region 215 can include a specular reflective surface having a reflective material, for reflecting the first portion of the exciting light. Since the first portion of the exciting light is obliquely incident to the reflective region 215 at the preset angle, the optical path of the first portion of the exciting light shifts with respect to an incidence optical path after the reflective region 215 reflects the first portion of the exciting light at a mirror symmetrical angle, such that the first portion of the exciting light is reflected from the wavelength conversion device 207 back to the second region 205b of the region light-splitting device 205 which is a different region from the incidence region (i.e., the first region 205a) of the exciting light, thereby avoiding loss generated by the incidence region (i.e., the first region 205a) without adding additional elements, while improving a light utilization rate of the light source system 200.

The conversion region 214 may include a reflective surface provided with an excited light material and scattering powder, for receiving the second portion of the exciting light, converting the second portion of the exciting light into excited light, and reflecting the excited light to the wavelength conversion device. There can be one, two or more conversion regions, and each of the conversion regions can emit excited light of one color. The excited light may also correspondingly include excited light of one color (such as yellow excited light generated by provision of a yellow excited light material), excited light of two colors (such as red and green excited light generated by provision of red and green excited light materials), or excited light of three colors (such as red, green, and yellow excited light generated by provision of red, green, and yellow excited light materials). The excited light generated by the conversion region 214 is reflected and emitted in a form of Lambertian light, that is, being emitted with a relatively large light beam aperture, while the first portion of the exciting light reflected by the reflective region 215 is also reflected at a small angle due to being incident at a small angle, such that the optical path of the excited light emitted by the conversion region 214 is different from the optical path of the first portion of the exciting light emitted by the reflective region 215, and the aperture of the optical path of the excited light is relatively large and located at periphery of the first portion of the exciting light.

Further, the first portion of the exciting light reflected by the reflective region 215 of the wavelength conversion device 207 is transmitted and collected via the collection system 206a and then guided to the second region 205b of the region light-splitting device 205. The second region 205b is a region that reflects the exciting light (such as reflecting blue light), so the second region 205b guides (e.g., reflects) the first portion of the exciting light, which is reflected by the reflective region 215 of the wavelength conversion device, to the light exiting channel 216. The excited light emitted by the conversion region 214 of the wavelength conversion device 207 is transmitted and collected via the collection system 206a and then guided to the region light-splitting device 205, and the aperture of the optical path of the excited light is relatively large, so the excited light is also incident on the periphery of the incidence region of the first portion of the exciting light in the region light-splitting device 205, and the region light-splitting device 205 also guides (e.g., reflects) the excited light to the light exiting channel 216. An optical path channel of the excited light in the light exiting channel 216 surrounds an optical path channel of the first portion of the exciting light in the light exiting channel 216, so that space of the light exiting channel 216 of the light source system 200 can be relatively small, which alleviates a problem that the light source system has a relatively large volume due to the relatively large space of the light exiting channel and thus it is not conducive to minimization and miniaturization.

In the present embodiment, the light exiting channel 216 includes a first light exiting channel 216a and a second light exiting channel 216b. The region light-splitting device 205 guides (e.g., reflects) the light emitted by the wavelength conversion device 207 to the guiding device 212 via the first light exiting channel 216a, and the guiding device 212 guides (e.g., reflects) the light in the first light exiting channel 216a to the second light exiting channel 216b.

The first relay lens 206b may be located in the first light exiting channel between the region light-splitting device 205 and the guiding device 213 and configured to collect and converge the light in the first light exiting channel 216a and then provide it to the guiding device 212. The first relay lens 206b may include a collection lens, such as a convex lens.

The guiding device 212 is located on the optical path where the light emitted by the region light-splitting device 205 is located, and receives, via the first relay lens 206b, the first portion of the exciting light and the excited light that are reflected by the region light-splitting device 205.

The scattering device 210 is located on the optical path where the light emitted by the guiding device 212 is located, for receiving the light of the light exiting channel 216 and scattering the light emitted by the light exiting channel 216. Specifically, the scattering device 210 may be guided to the scattering device 210 after being collected and converged by the second relay lens 206c. The second relay lens 206c may also include a collection lens, such as a convex lens. The second relay lens 206c collects, via the scattering device 210, the light emitted by the light exiting channel 216, to an entrance of the optical-mechanical system 230.

Referring to FIG. 6, the scattering device 210 includes a scattering region 217 and a filtering region 218. The scattering region 217 and the filtering region 218 are disposed in a circumferential direction. When the light source system 200 is in operation, the scattering region 217 and the filtering region 218 are alternately located on the optical path of the first portion of the exciting light and the excited light that are emitted by the light exiting channel 216, in such a manner that the scattering region 217 scatters the exciting light emitted from the light exiting channel 216, and the filtering region 218 filters the excited light emitted by the light exiting channel 216, so as to filter out other light that has a color different from the color of the excited light. It will be appreciated that the scattering region 217 may be provided with a scattering material, and the filtering region 218 is provided with a filtering material.

In the present embodiment, the number of the filtering regions corresponds to the number of the conversion regions. It can be understood that when the number of the conversion region is one, two or more and the excited light may also correspondingly includes excited light of one color (such as yellow excited light generated by provision of a yellow excited light material), excited light of two colors (such as red and green excited light generated by provision of red and green excited light materials) or excited light of three colors (such as red, green, and yellow excited light generated by provision of red, green, and yellow excited light materials), and the number of the filtering regions may also be one, two or three, respectively. Each filtering region filters the excited light emitted by a corresponding conversion region, so as to filter out other light that has a color different from the color of the received excited light. The filtering region may also correspondingly include a filtering material of one color (such as a yellow filtering material for filtering yellow excited light), filtering materials of two colors (such as red and green filtering materials respectively disposed on two filtering regions) or filtering materials of three colors (such as red, green, and yellow filtering materials disposed on three filtering regions).

In the present embodiment, the scattering device 210 and the wavelength conversion device 207 are formed into one piece, and the scattering region 217 and the filtering region 218 are located inside the reflective region 215 and the conversion region 214. The scattering device 210 and the wavelength conversion device 207 are concentrically disposed, and can have the same driving shaft that is located at a circle center for driving the scattering device 210 and the wavelength conversion device 207 to rotate in the circumferential direction.

The optical-mechanical system 230 is configured to receive the light emitted by the scattering device 210 and homogenize and combine the light emitted by the scattering device 210. The optical-mechanical system 230 can include an optical-mechanical square rod disposed in front of a spatial light modulator of a display device (e.g., a projection device), and the spatial light modulator is configured to modulate, according to image data, light emitted by the optical-mechanical square rod, to generate image light required for displaying an image. The first portion of the exciting light collected by the second relay lens 206c is further scattered by the scattering region 217 and then guided to the entrance of the optical-mechanical system 230, and the excited light collected by the second relay lens 206c is further filtered by the filtering region 218 and then guided to the entrance of the optical-mechanical system 230. It can be understood that, based on structures of the wavelength conversion device 207 and the scattering device 210 above, the first portion of the exciting light and the excited light are sequentially guided to the optical-mechanical system 230 (that is, being guided to the light homogenizing device in different time periods), and the optical-mechanical system 230 combines the first portion of the exciting light and the excited light in a time division multiplexing manner.

In the light source system 200, the region light-splitting device 205 controls the exciting light to be obliquely incident to the reflective region 215 and the conversion region 214 at a preset angle via the first region 205a, and the reflective region 215 reflects the first portion of the exciting light to the second region 205b, such that the second region 205b guides the first portion of the exciting light to the light exiting channel 216. Since after being reflected by the reflective region 215, the optical path of the first portion of the exciting light shifts with respect to the incidence optical path and the optical axes are not coincident, the region of the region light-splitting device 205 to which the first portion of the exciting light returns from the wavelength conversion device 207 is different from the incidence region (the first region) of the exciting light, thereby avoiding the loss generated by the incidence region without adding an additional element, improving the light utilization rate of the light source system 200 and avoiding unevenness of light caused by loss at a regional coating in the related art.

Further, in the light source system 200, the exciting light and the excited light pass through different optical paths, so when a distance between the collection system 206 and the wavelength conversion device 207 is out of focus, not only brightness of the light emitted by the optical-mechanical square rod of the existing light source will decrease, but also magnitudes of decrease in brightness of the exciting light and the excited light are different due to their different optical paths, and this will further cause color coordinates of combined white light to change. In addition, when the exciting light excites the wavelength conversion device 207, the light beam is obliquely incident at the preset angle, so that when the distance between the collection system 206a and the wavelength conversion device 207 is out of focus, not only a size of a light spot on a surface of the wavelength conversion device 207 will change, but also a position of the light spot will move vertically, which causes an imaging position of the light spot at an entrance of optical-mechanical square rod of the optical-mechanical system 230 to move, thereby reducing a coupling efficiency of the optical-mechanical square rod and further reducing the brightness of the light emitted by the optical-mechanical square rod.

Therefore, in view of the above problems, the light source system 200 of the present disclosure is further provided with a distance adjustment device 202. The distance adjustment device 202 can be adjacent to one of the collection system 206a and the wavelength conversion device 207, and is configured to adjust the distance between the collection system 206a and the wavelength conversion device 207. By changing the distance between the collection system 206a and the wavelength conversion device 207, the brightness of the light emitted by the optical-mechanical system 230 can be changed, and eventually, luminous flux of the light source system 200 is changed, such that the light emitted by the optical-mechanical system 230 meets demands. In an embodiment, when the brightness of the light emitted by the optical-mechanical system 230 reaches its maximum, the distance between the collection system 206a and the wavelength conversion device 207 is optimal. That is, the distance adjustment device 202 adjusts the distance between the collection system 206a and the wavelength conversion device 207 to a distance corresponding to a case in which the brightness of the light emitted by the optical-mechanical system 230 reaches the maximum, so that the light source system 200 has higher brightness and better satisfies users' needs, while leading to the better user experience.

Further, since the change in the distance between the collection system 206a and the wavelength conversion device 207 can affect an excitation efficiency of the wavelength conversion device 207, a collection efficiency of the collection system 206a and an efficiency of the optical-mechanical square rod of the light source system 200, by providing the distance adjustment device 202, the excitation efficiency of the wavelength conversion device 207, the collection efficiency of the collection system 206a and the optical-mechanical efficiency of the light source system 200 can be adjusted by adjusting the distance between the collection system 206a and the wavelength conversion device 207, so as to adjust the brightness of the light emitted by the light source system 200, thereby leading to the higher efficiency of the light source system 200.

Figure 7:
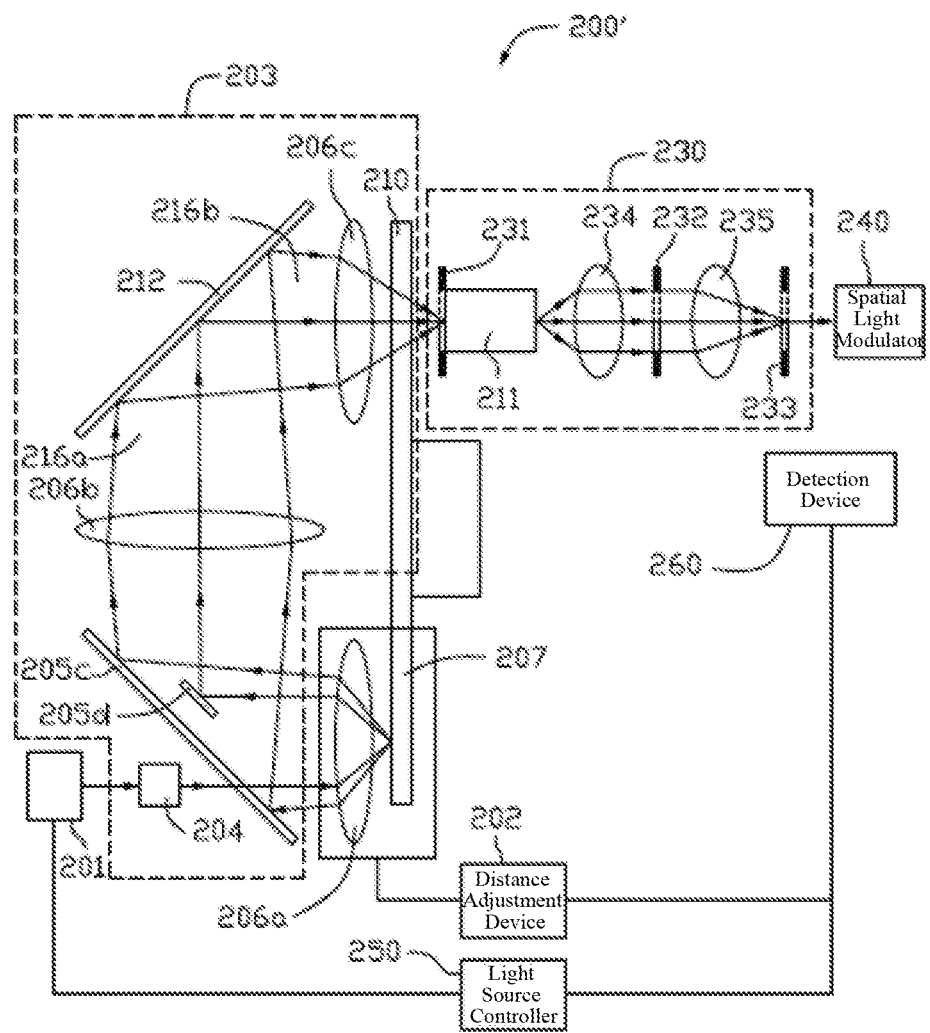
FIG. 7 is a structural schematic diagram of a light source system according to a second embodiment of the present disclosure.

Referring to FIG. 7, FIG. 7 is a structural schematic diagram of a light source system 200' according to a second embodiment of the present disclosure. The light source system 200' has substantially the same structure as the light source system 200 of the first embodiment, that is, the above description of the light source system 200 can be basically applied to the light source system 200', and a difference between the two mainly lies in that the optical-mechanical system 230 has different structures. Specifically, the distance adjustment device 202 can adjust the distance between the collection system 206a and the wavelength conversion device 207 to change the brightness of the light emitted by the optical-mechanical system 230. In a specific embodiment, the distance adjustment device 202 adjusts the distance between the collection system 206a and the wavelength conversion device 207 to change the brightness and the color coordinates of the light emitted by the optical-mechanical system, so that the distance adjustment device 202 can serve as an adjustment mechanism for the brightness and the color coordinates of the optical-mechanical system 230. Further, the light source system 200' further includes a light source controller 250, and the light source controller 250 is configured to modulate intensity of the exciting light emitted by the exciting light source 201, so as to adjust intensity of the light emitted by the optical-mechanical system 230.

In the present embodiment, the optical-mechanical system 230 includes a light homogenizing device 211, a first stop 231, a second stop 232, a third stop 233, and relay lenses 234, 235. The first stop 231 is disposed at an entrance of the light homogenizing device 211. The relay lens 234 is disposed between the light homogenizing device 211 and the second stop 232. The relay lens 235 is disposed between the second stop 232 and the third stop 233.

The first stop 231 is disposed at a position of the entrance of the light homogenizing device 211 (such as an optical-mechanical square rod), and an aperture has same dimension as the entrance of the optical-mechanical square rod, for filtering out stray light that is emitted by the scattering device from the light exiting channel to an outer side of the entrance of the optical-mechanical square rod. It can be understood that when the light source system 200 or 200' is applied to a display device (such as a projection device), a spatial light modulator 240 of the display device can be further provided in the optical path on which the light emitted by the optical-mechanical system 230 is located. The spatial light modulator 240 is configured to modulate the light emitted by the light source system 200 or 200' according to the image data to be displayed, so as generate image light. It can include a DMD spatial light modulator.

The second stop 232 is an aperture stop of the optical-mechanical system 230, and light that has a light beam aperture larger than the stop aperture cannot pass through the optical-mechanical system 230. The third stop 233 is disposed at the position of the spatial modulator of the spatial light modulator 240, and its aperture size is the same as a size of a light incidence surface of the spatial modulator that receives light, that is, light having a light spot size larger than the size of the spatial modulator cannot pass, whereby overfill of the light emitted by the light source system 200' can be filtered out. It will be appreciated that the luminous flux obtained by testing at the third stop 233 is luminous flux that can be actually utilized by the spatial light modulator 240.

The optical-mechanical system 230 provided by the present embodiment can form, with the distance adjustment device 202, a mechanism for adjusting the brightness of the light source. That is, by the distance adjustment device 202 adjusting the distance between the collection system 206a and the wavelength conversion device 207, the brightness of the light emitted by the optical-mechanical system 230 is changed. In one embodiment, when a brightness value of the light emitted by the optical-mechanical system 230 reaches a maximum, the distance between the collection system 206a and the wavelength conversion device 207 is optimal, that is, the distance adjustment device 202 adjusts the distance between the collection system 206a and the wavelength conversion device 207 to a distance corresponding to a case in which the brightness of the light emitted by the optical-mechanical system 230 reaches the maximum.

Figure 8:
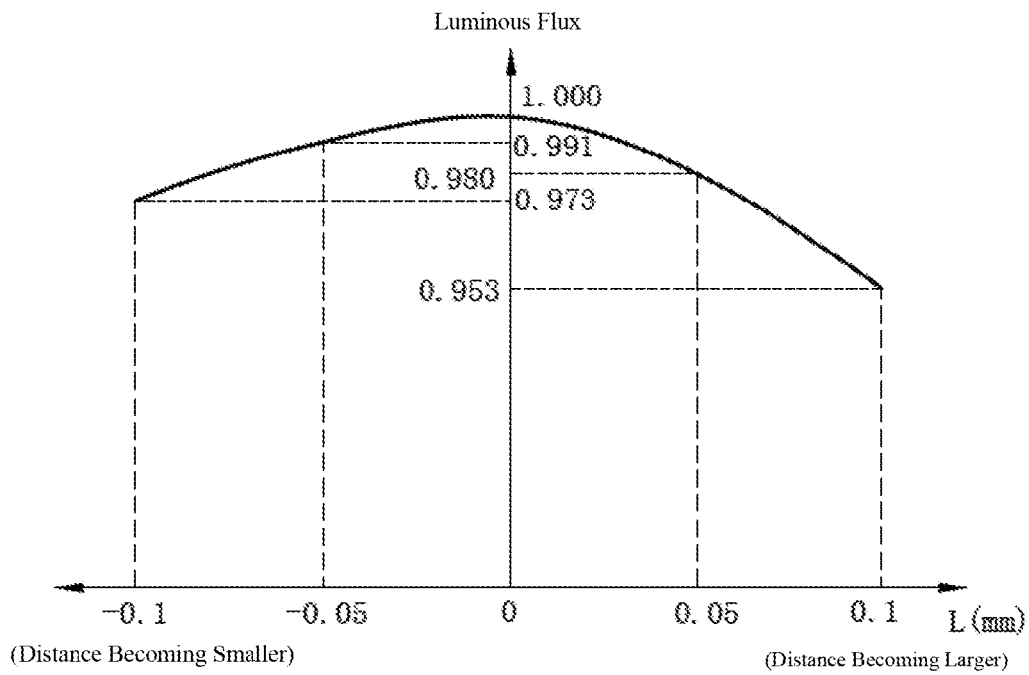
FIG. 8 illustrates a curve showing influence of change in a distance between a collection system and a wavelength conversion device of the light source system shown in FIG. 7 on luminous flux of the light source system.

Referring to FIG. 8, FIG. 8 illustrates a curve showing influence of the change of the distance L between the collection system 206a and the wavelength conversion device 207 of the light source system 200' shown in FIG. 7 on the luminous flux of the light source system 200' (e.g., the luminous flux of the light emitted by the optical-mechanical system 230). Specifically, when the distance L is decreased, the light spot of the exciting light on the surface of the wavelength conversion device 207 becomes larger, the light spot of the exciting light moves downward, and respective optical efficiencies of the light source system 200' vary as follows.

For the excitation efficiency of the wavelength conversion device 207: when the distance L decreases, a power of the exciting light does not change, while the size of the light spot of the exciting light becomes larger, the surface light power of the wavelength conversion device 207 is reduced, and the excitation efficiency is improved.

For the collection efficiency of the collection system 206a, when the distance L is decreased, a distance between the collection system 206a and the light spot of the exciting light becomes smaller, and the collection efficiency is improved.

For the coupling of the optical-mechanical system 230 (i.e., the optical-mechanical square rod), when the distance L is decreased, due to movement of the light spot of the exciting light on the surface of the wavelength conversion device 207, a position of the imaged light spot thereof (i.e., the light spot of the exciting light and the excited light that are emitted by the light exiting channel via the scattering device 210) at the entrance of the optical-mechanical system 230 moves, and it will be filtered out by the first stop 231, so that the coupling efficiency of the optical-mechanical system 230 (i.e., the optical-mechanical square rod) will be reduced.

For the optical-mechanical efficiency (i.e., the efficiency of the optical-mechanical system 230), when the distance L is reduced, since the excited light having a large angle is collected by the collection system 206a, the light beam converges at the entrance of the optical-mechanical system 230 (i.e., the optical-mechanical square rod) with a relatively large angle, and during the process of homogenizing through the optical-mechanical system 230 (i.e., the optical-mechanical square rod), the number of reflection times of the light having a large angle increases, and there is loss of reflectance; and when the light passes through the second stop 232, the light having a large angle cannot pass, so that the efficiency of the optical-mechanical is relatively low.

Conversely, when the distance L is increased, the light spot of the surface exciting light of the wavelength conversion device 207 becomes larger, and the light spot of the exciting light moves upward, and the optical efficiencies change as follows.

For the excitation efficiency of the wavelength conversion device 207, when the distance L is increased, the power of the exciting light does not change, the size of the light spot of the exciting light becomes smaller, the surface light power of the wavelength conversion device 207 is reduced, and the excitation efficiency is lowered.

For the collection efficiency of the collection system 206a, when the distance L is increased, the distance between the collection system and the light spot of the exciting light becomes larger, and the collection efficiency is reduced.

For the coupling of the optical-mechanical system 230 (i.e., the optical-mechanical square rod), when the distance L is increased, due to the movement of the surface light spot of the wavelength conversion device 207, its imaging position at the entrance of the optical-mechanical system 230 moves, and it will be filtered out by the first stop 231, so that the coupling efficiency of the optical-mechanical system 230 will be decreased.

For the optical-mechanical efficiency (i.e., the efficiency of the optical-mechanical system 230), since the collection system 206a collects light having a relatively small angle, Thus, the light beam converges at the entrance of the optical-mechanical system 230 (i.e., the optical-mechanical square rod) with a relatively small angle, and during the process of homogenizing through the optical-mechanical system 230, the number of the reflection times of the light having a small angle will be reduced to a certain extent, and the loss of reflectance is reduced; and when the light passes through the second stop 232, the light having a small angle completely passes, and the optical-mechanical efficiency (i.e., the efficiency of the optical-mechanical system 230) is increased by a relatively small extent.

Based on the above various optical efficiencies, by adjusting the value of the distance L, the luminous flux of the light emitted by the optical-mechanical system 230 (i.e., the light source system 200') can be tested at a position where the light is emitted from the third stop 233, and normalized data of the luminous flux is shown in FIG. 8. Compared with an existing light source system, when an allowable range of the luminous flux of the light source system 200' is above 98%, tolerance of the distance L is controlled to be within 0.05 mm.

Figure 9:
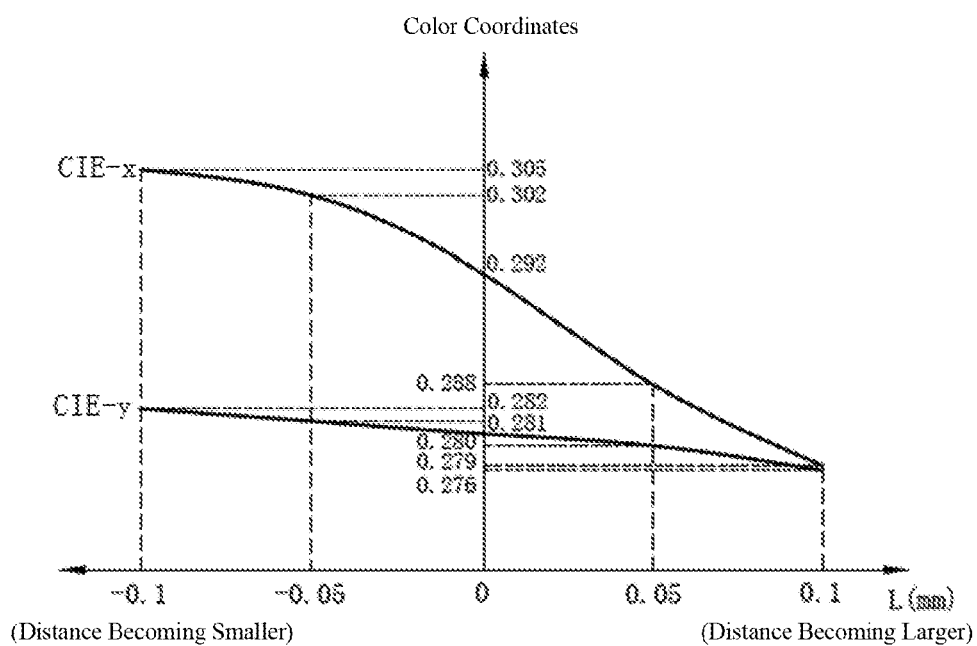
FIG. 9 illustrates curves showing influence of change in a distance between a collection system and a wavelength conversion device of the light source system shown in FIG. 7 on color coordinates of the light source system.

In addition, the exciting light and the excited light pass through different optical paths, so that when the distance L changes, not only the brightness of the light emitted by the existing light source system will be decreased, but also the color coordinates of the combined white light will be changed due to different magnitudes of the decrease in brightness of the exciting light and the excited light. Referring to FIG. 9, FIG. 9 illustrates curves showing influence of the change of the distance between the collection system 206a and the wavelength conversion device 207 of the light source system 200' shown in FIG. 7 on the color coordinates of the light source system 200'. As can be seen from FIG. 9, by adjusting the value of the distance L, the color coordinates of the white light emitted from the light source system 200' tested at the light exiting position of the third stop 233 will change. That is, when the distance L between the collection system 206a and the wavelength conversion device 207 changes, both the brightness and the color coordinates of the light emitted from the optical-mechanical system 230 change, and curves showing changes of the value of the distance L and the color coordinates are as shown in FIG. 9. Specifically, color coordinates (x, y) include an x value and a y value, and the curve CIE-x in FIG. 9 is a change curve of the x value of the color coordinates with respect to the distance L, and the curve CIE-y is a change curve of the y value of the color coordinates with respect to the distance L.

Further, as can be seen from the curves in FIGS. 8 and 9, in the light source system 200' of the present disclosure, requirement for the distance between the collection system 206a and the wavelength conversion device 207 is higher than that of the existing light source system. However, the distance adjustment device 202 and the optical-mechanical system 230 in the above embodiment can be used to perform adjustment in such a manner that the brightness of the light emitted by the light source system 200' is highest, thereby making the optical efficiency of the light source system 200' reach the maximum.

Further, according to the above embodiment, since the distance between the collection system 206a and the wavelength conversion device 207 affects the luminous flux of the light emitted by the light source system 200' and also affects the color coordinates of the light emitted therefrom (i.e., the white light combined by the exciting light and the excited light), the above-described distance adjustment device 202 and the optical-mechanical system 230 can be utilized to achieve a dynamic light source having high consistence.

Specifically, since the optical paths of the exciting light and the excited light are separated and the magnitude of the change in the efficiency of the excited light is the same, when combining the light, all the excited light is considered as yellow excited light with color coordinates of $(x_Y, y_Y)$ and the brightness of $L_Y$, and blue exciting light with color coordinates of $(x_B, y_B)$ and the brightness of $L_B$, and $L_Y$ is much larger than $L_B$. It is assumed that the combined white light has color coordinates of (x, y) and brightness of L, then it can be obtained according to a theory of colorimetry that the color coordinates (x, y) and the brightness L of the white light conform to following formulas:

$$x = \frac{\frac{x_B}{y_B} \times L_D + \frac{x_Y}{y_Y} \times L_Y}{\frac{L_B}{y_B} + \frac{L_Y}{y_Y}}$$

$$y = \frac{L_B + L_Y}{\frac{L_B}{y_B} + \frac{L_Y}{y_Y}}$$

$$L = L_Y + L_B$$

When the distance between the collection system 206a and the wavelength conversion device 207 becomes larger, the magnitude of the decrease in efficiency of the excited light is larger than that of the blue exciting light, so that a relative value of $L_B$ is increased; and when the white light is combined, both the x and y values of the color coordinates will be decreased, the color coordinates drift towards lower left in a color gamut map, and at this time, the large decrease magnitude of the excited light also results in a larger decrease trend of the brightness of the white light. When the distance L between the collection system 206a and the wavelength conversion device 207 becomes smaller, the magnitude of the decrease in efficiency of the blue exciting light is larger than that of the excited light, so that a relative value of $L_Y$ is increased; and when the white light is combined, both the x and y values of the color coordinates will be increased, and the color coordinates drift towards upper right in the color gamut map.

In the light source system 200', due to differences in coating and processing of the optical component, transmittance spectra of the different light source systems 200' are different, which further makes the color coordinates of the light emitted by the light source systems 200' different. In such novel light source system 200', adjustment of the consistency of the light source system 200' can be performed just by a principle that the color coordinates described above are variable. For example, there are two light source systems 200' including a first one and a second one. Color coordinates and brightness of the first light source system 200' are 0.279, 0.288, 8000 lm, and color coordinates and brightness of the first light source system 200' are 0.281, 0.292, 8500 lm. In order to enable the light emitted by the light source system 200' to have a higher color temperature and enable the color and the brightness of the light source system 200' to be consistent, the second light source system 200' is adjusted to increase the distance between the collection system and the wavelength conversion device by about 0.05 mm, such that the color coordinates of the white light drift towards the lower left until the color coordinates thereof are the same as those of the first light source system 200', thereby making the colors of the two light source systems 200' consistent. During the adjustment of the second light source system 200', the brightness thereof is also lost to a certain extent. Based on the above data, the brightness of the second light source system 200' after the adjustment is about 8300 lm. At this time, the brightness of the two light source systems 200' is inconsistent, and the second light source system 200' has higher brightness than the first light source system 200', so that a current of the exciting light source of the second source system 200' can be lowered by the light source controller 250 of the second source system 200', to enable the brightness of the light emitted therefrom to be consistent with that of the first source system 200'. Finally, the color and the brightness of the two light source systems 200' are consistent. Thus, the light source system 200' is particularly well suitable for illumination and projection systems that require very high level of consistency of emitted light, such as a tiled wall.

Further, in order to achieve a purpose of accurately adjusting the brightness and the color coordinates of the light emitted by the optical-mechanical system 230, in the present embodiment, the light source system 200' further includes a detection device 260. The detection device 260 may be a brightness and color detection device for detecting the brightness and the color coordinates of the light emitted by the light source system 200', such as, for detecting the color coordinates and the brightness of mixed light of the excited light and the exciting light that are emitted by the optical-mechanical system 230. The detection device 260 may be disposed at the light exiting position of the light source system 200' (e.g., the light exiting position of the optical-mechanical system 230). The distance adjustment device 202 is configured to adjust the distance between the collection system 206a and the wavelength conversion device 207 in accordance with information detected by the detection device, to make the brightness and/or the color coordinates of the light emitted by the optical-mechanical system 230 satisfy a preset condition.

In one embodiment, the detection device 260 detects the brightness of the excited light, the exciting light, or the mixed light of the excited light and the exciting light that are emitted by the optical-mechanical system 230. The distance adjustment device 202 adjusts the distance between the collection system 206a and the wavelength conversion device 207 to a distance corresponding to the maximum brightness that the detection device 260 can detect. That is, the preset condition is a condition under which the maximum brightness can be detected by the detection device 260 or the light emitted by the optical-mechanical system 230 reaches the maximum brightness.

Specifically, when the brightness of the light emitted by the optical-mechanical system 230 reaches the maximum, the light brightness detected by the detection device 260 reaches the maximum brightness, and the distance between the collection system 206a and the wavelength conversion device 207 is optimal, that is, the distance adjustment device 202 adjusts the distance between the collection system 206a and the wavelength conversion device 207 to a distance corresponding to a case in which the brightness of the light emitted by optical-mechanical system 230 reaches the maximum, such that the emitted light detected by the detection device 260 reaches the maximum brightness, that is, the light emitted by the optical-mechanical system 230 reaches the maximum brightness.

In another embodiment, the distance adjustment device 202 further adjusts the distance between the wavelength conversion device 207 and the collection systems 206a based on the brightness and the color coordinates of the emitted light of the optical-mechanical system 230 detected by the detection device 260. The detection device 260 can detect the color coordinates and the brightness of the mixed light of the excited light and the exciting light that are emitted by the optical-mechanical system 230. The distance adjustment device 202 adjusts the distance between the collection system 206a and the wavelength conversion device 207 according to the color coordinates detected by the detection device 260, to allow the color coordinates detected by the detection device 260 to reach target color coordinates.

Figure 10:
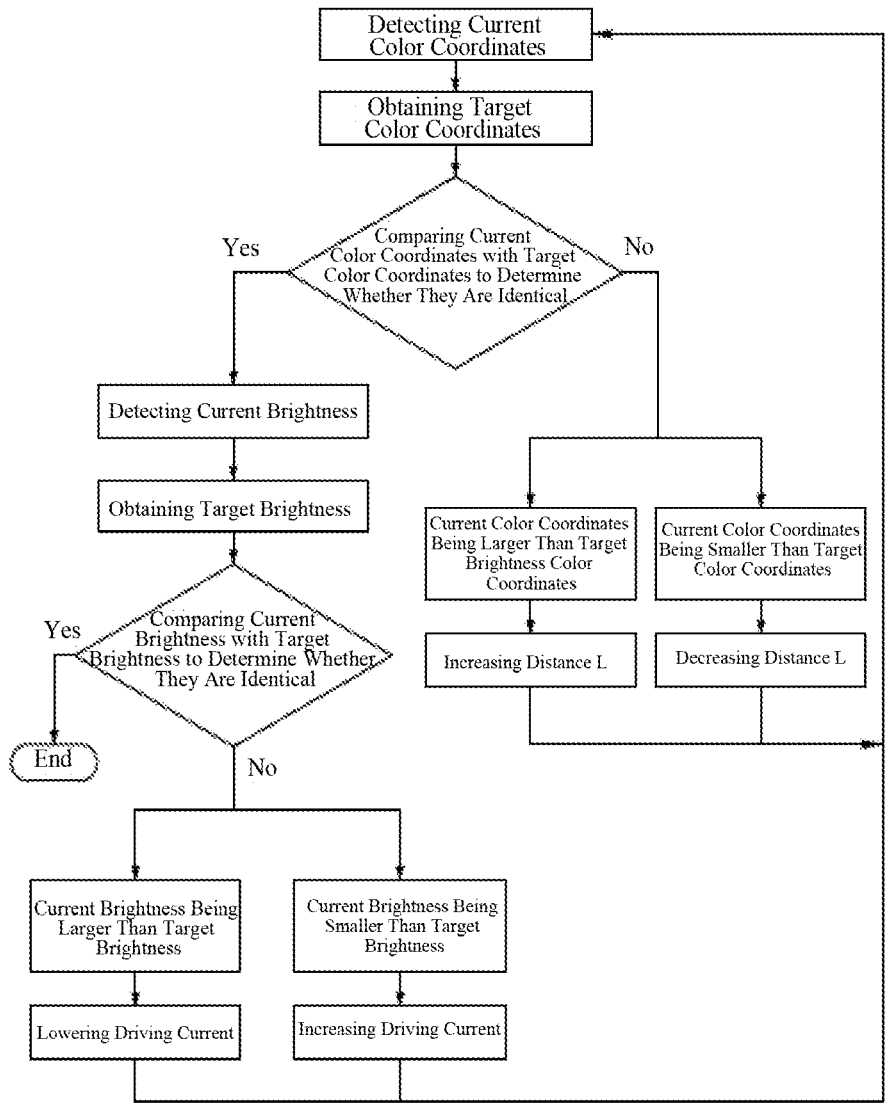
FIG. 10 is a flow chart showing a method for adjusting brightness and color coordinates of the light source system shown in FIG. 7.

Specifically, referring to FIG. 10, when the color coordinates (i.e., current color coordinates) detected by the detection device 260 are larger than the target color coordinates, the distance adjustment device 202 reduces the distance between the wavelength conversion device 207 and the collection system 206a. When the color coordinates detected by the detection device 260 are smaller than the target color coordinates, the distance adjustment device 202 increases the distance L between the wavelength conversion device 207 and the collection system 206a. When the color coordinates detected by the detection device 260 are equal to the target color coordinates, the distance adjustment device 202 maintains the distance L between the wavelength conversion device 207 and the collection system 206a unchanged. It can be understood that the target color coordinates can be input, through an input device (such as a keyboard, a touch screen, an OSD button, or the like), to the light source system 200' or a display device using the light source system 200', such that the light source system 200' or the display device using the light source system 200' can learn the target color coordinates, perform the step of comparing the color coordinates and target color coordinates, and control, according to the comparison result, the distance adjustment device 202 to adjust the distance L in such a manner that the actual color coordinates of the light emitted by the light source system 200' can reach the target color coordinates. Specifically, the detection device 260 may output a signal of the current color coordinates to the distance adjustment device 202, and the distance adjustment device 202 can include a signal processing unit and an adjustment unit. The signal processing unit is configured to compare the current color coordinates with the target color coordinates and output a control signal according to the comparison result, to control the adjusting unit to adjust the distance L.

Further, in the present embodiment, the light source controller 250 can adjust, according to the brightness detected by the detection device 260, the intensity of the exciting light emitted by the exciting light source in such a manner that the brightness detected by the detection device 260 reaches target brightness. Specifically, the light source controller 250 modulates the intensity of the exciting light based on the brightness and the color coordinates of the light emitted by the light source system 200' detected by the detection device 260. Referring to FIG. 10, when the brightness (i.e., the current brightness) of the light emitted by the optical-mechanical system 230 detected by the detection device 260 is larger than the target brightness, the light source controller 250 lowers the driving current of the exciting light source 201, so that the intensity of the exciting light is lowered. When the brightness of the light emitted by the optical-mechanical system 230 detected by the detection device 260 is smaller than the target brightness, the light source controller 250 increases the driving current of the exciting light source 201, so that the intensity of the exciting light increases. When the current brightness detected by the detection device 260 is equal to the target brightness, the light source controller 250 maintains the driving current of the exciting light source 201 unchanged, so that the intensity of the exciting light remains unchanged. It can be understood that the target brightness can also be input to the light source system 200' or the display device using the light source system 200' through the input device (such as a keyboard, a touch screen, an OSD button, or the like), such that the light source system 200' or the display device using the light source system 200' can learn the target brightness and perform the step of comparing the current brightness with the target brightness. The light source controller 250 can adjust the driving current of the exciting light source 201 according to the comparison result, so as to adjust the luminous flux of the light source system 200' by adjusting the intensity of the exciting light.

It can be understood that the step of comparing and adjusting the color coordinates of the light source system 200' may occur before the step of comparing and adjusting the brightness. That is, after the detection device 260 detects the color coordinates and the brightness value, the distance adjustment device 202 of the light source system 200' first compares the color coordinates with the target color coordinates and controls and adjusts the color coordinates to reach the target color coordinates according to the comparison result, and then the light source system 200' compares the brightness with the target brightness and controls and adjusts the brightness to reach the target brightness according to the comparison result.

Further, when two or more of the light source systems 200' and the display device having the light source system 200' are used in an environment such as tiled wall display and thus it is necessary to adjust color coordinates and brightness of the two or more of the light source systems 200' to be consistent, the target color coordinates and the target brightness may be input to the respective light source systems 200', and each light source systems 200' adjusts its own color coordinates and brightness to the target color coordinates and target brightness by its distance adjustment device 202 and light source controller 250. It can be understood that, since the brightness of the respective light source systems 200' may be different, in order to ensure that the brightness of the respective light source systems 200' are consistent after the adjustment, a minimum value in the plurality of brightness of the current respective light source systems 200' may be determined in advance, and the minimum value is used as the target brightness, so that each of the light source systems 200' can be adjusted to the minimum value, thereby causing the brightness of the two or more of the light source systems 200' and the display device having the light source system 200' used in the environment such as a tiled wall or the like to be consistent.

Figure 11:
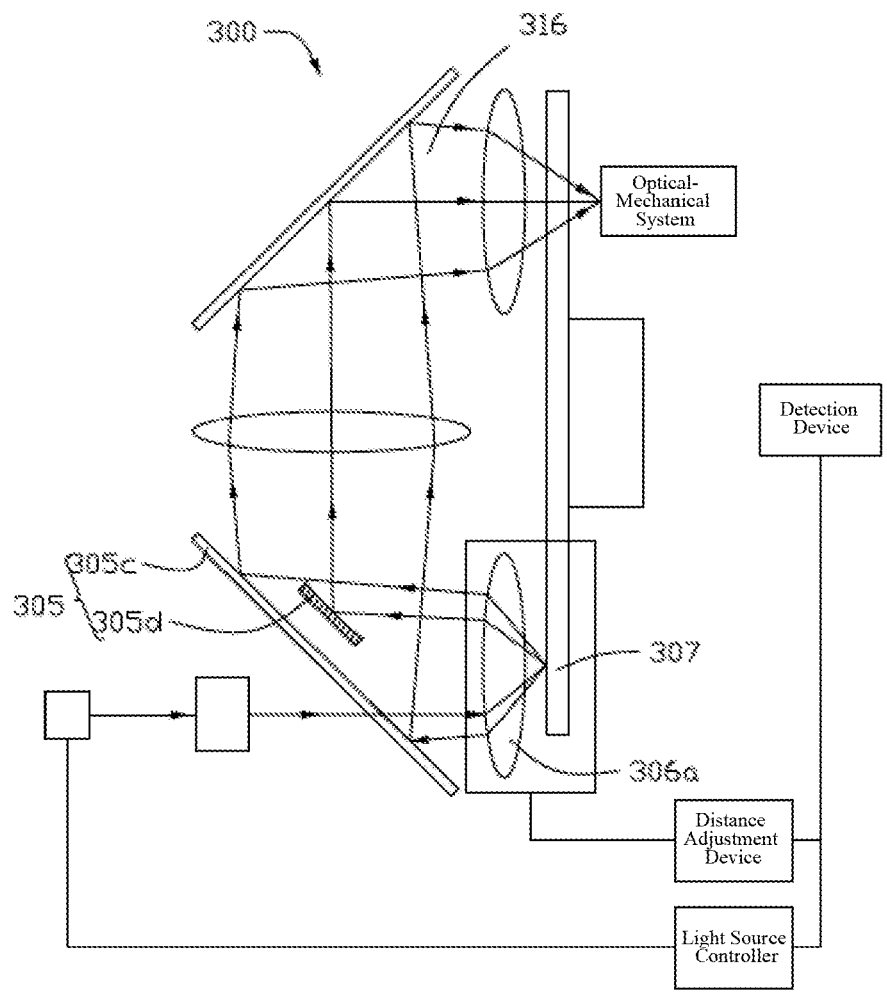
FIG. 11 is a structural schematic diagram of a light source system according to a third embodiment of the present disclosure.

Referring to FIG. 11, FIG. 11 is a structural schematic diagram of a light source system 300 according to a third embodiment of the present disclosure. The light source system 300 is basically the same in structure as the light source system 200' of the second embodiment. That is, the above description of the light source system 200' can be basically applied to the light source system 300, and a difference between the two mainly lies in that the region light-splitting device 305 is different. Specifically, in the present embodiment, the reflective surface of the mirror 305d of the region light-splitting device 305 is a curved surface, such as a concave surface. The concave reflective surface of the mirror 305d receives the first portion of the exciting light emitted by the wavelength conversion device 307 via the collection system 306a and reflects the first portion of the exciting light to the light exiting channel 316. The light-splitting sheet 305c also receives a portion of the excited light transmitted through the mirror and reflects the portion of the excited light to the light exiting channel 316.

Figure 12:
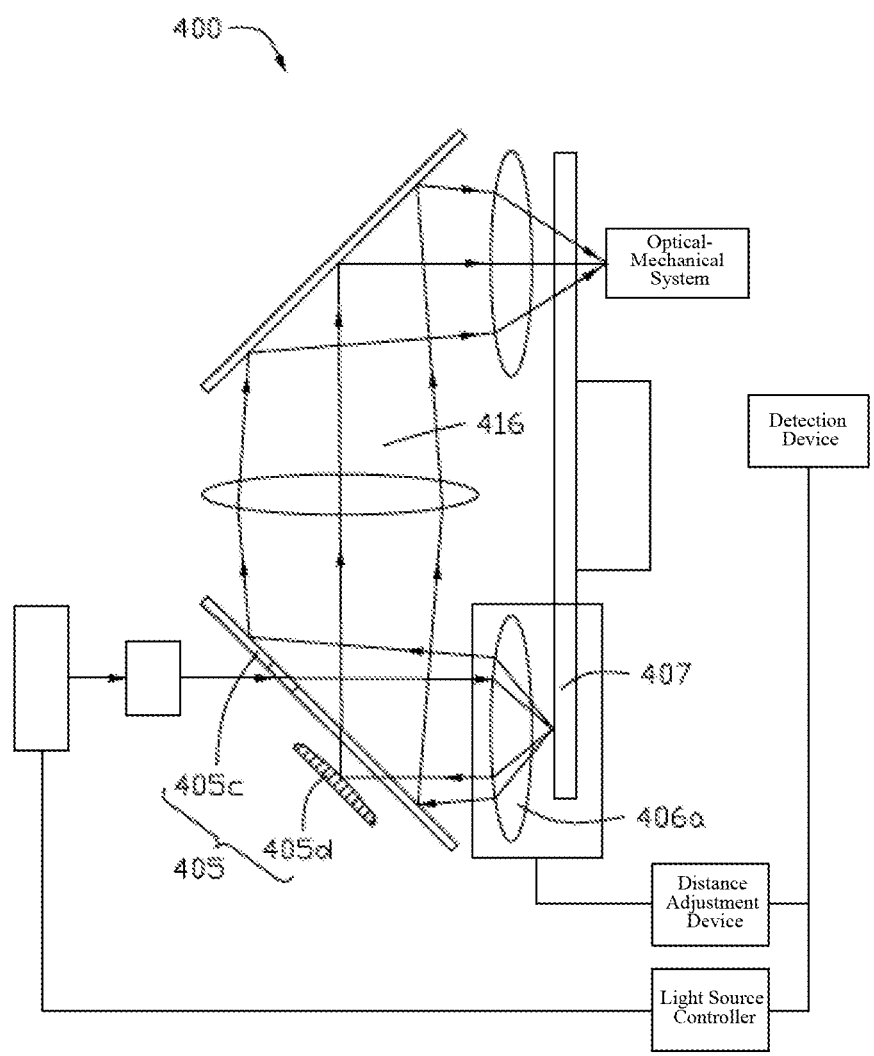
FIG. 12 is a structural schematic diagram of a light source system according to a fourth embodiment of the present disclosure.

Referring to FIG. 12, FIG. 12 is a structural schematic diagram of a light source system 400 according to a fourth embodiment of the present disclosure. The light source system 400 is substantially identical in structure to the light source system 200' of the second embodiment. That is, the above description of the light source system 200' can be basically applied to the light source system 400, and the difference between the two mainly lies in that the region light-splitting device 405 is different. Specifically, in the present embodiment, the reflective surface of the mirror 405d of the region light-splitting device 405 is a curved surface, such as a convex surface, and the mirror 405d is disposed on a side of the light-splitting sheet 405c facing away from the wavelength conversion device 407. The convex reflective surface of the mirror 405d receives the first portion of the exciting light transmitted through the light-splitting sheet and reflects the first portion of the exciting light to the light exiting channel 416. The light-splitting sheet 405c receives the excited light emitted by the wavelength conversion device 407 via the collection system 406a and reflects the excited light to the light exiting channel 416.

Figure 13:
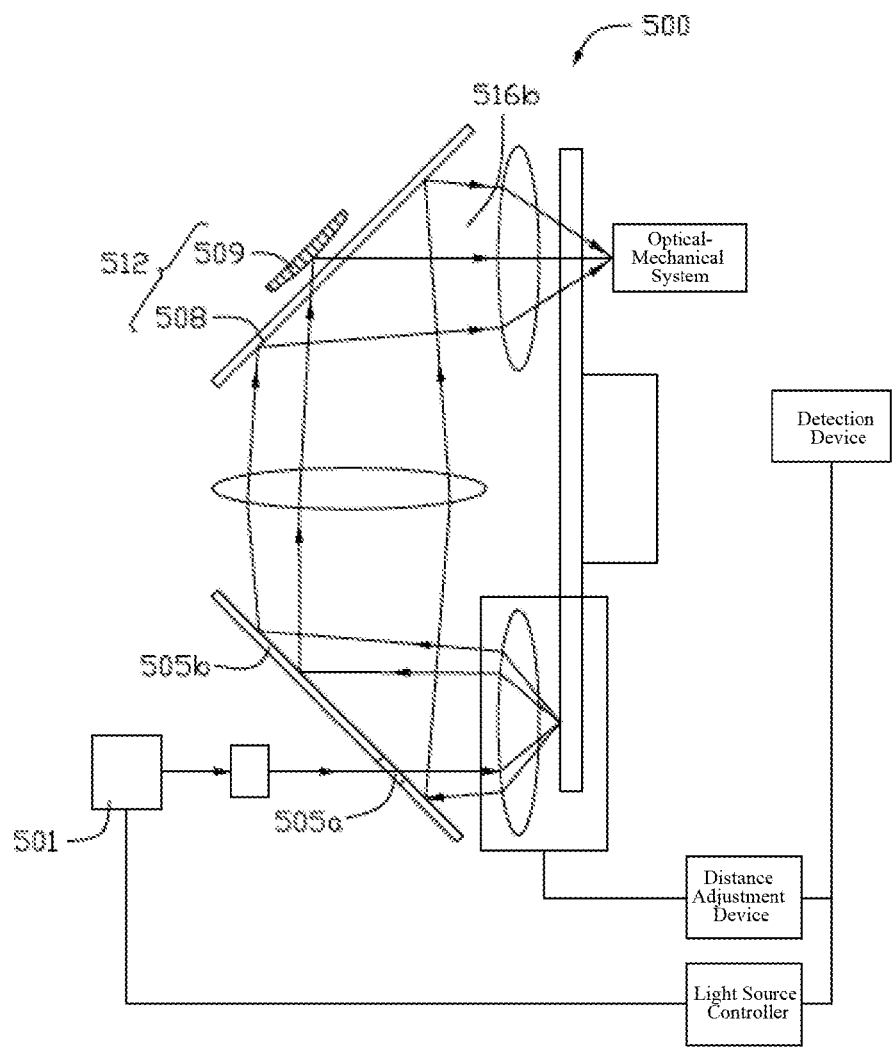
FIG. 13 is a structural schematic diagram of a light source system according to a fifth embodiment of the present disclosure.
Figure 14:
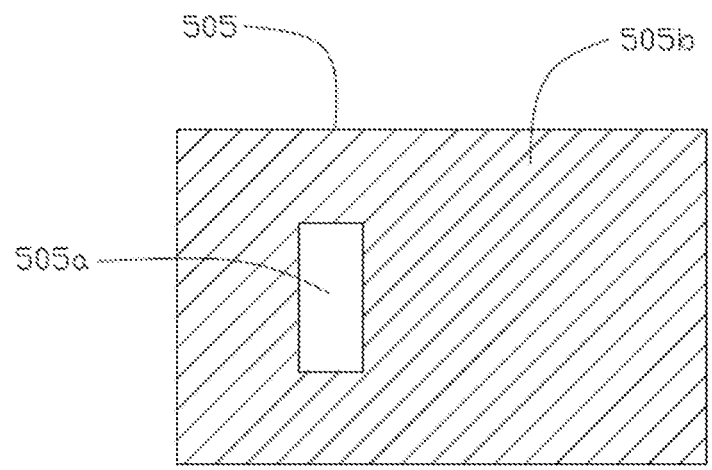
FIG. 14 is a structural schematic diagram of a region light-splitting device of the light source system shown in FIG. 13.

Referring to FIG. 13 and FIG. 14, FIG. 13 is a structural schematic diagram of a light source system 500 according to a fifth embodiment of the present disclosure, and FIG. 14 is a structural schematic diagram of a region light-splitting device of the light source system 500 shown in FIG. 13. The light source system 500 is substantially identical in structure to the light source system 200' of the second embodiment. That is, the above description of the light source system 200' can be basically applied to the light source system 500, and the difference between the two mainly lies in that the both the region light-splitting device 505 and the guiding device 512 are different. Specifically, in the present embodiment, the region light-splitting device 505 includes a light-splitting sheet 505c, the light-splitting sheet 505c is substantially the same as the light-splitting sheet 505c in the first embodiment, the first region 505a transmits exciting light emitted by an exciting light source 501, and the second region 505b reflects the excited light and the first portion of the exciting light, and the structural principle thereof will not be described again herein. The guiding device 512 includes a light-splitting sheet 508 and a mirror 509. The light-splitting sheet 508 receives the excited light emitted by the region light-splitting device 505 via a first light exiting channel 516a and reflects the excited light to a second light exiting channel 516b. The mirror 509 receives a first portion of the exciting light emitted by the region light-splitting device 505 via the first light exiting channel 516a and reflects the first portion of the exciting light to the second light exiting channel 516b.

In the present embodiment, the mirror 509 is also a curved mirror, and a reflective surface thereof is a curved surface, such as a convex surface. The light-splitting sheet 508 transmits the first portion of the exciting light in the first light exiting channel 516a to the mirror 509. The mirror 509 reflects the first portion of the exciting light, and the first portion of the exciting light is transmitted to the second light exiting channel 516b via the light-splitting sheet.

Figure 15:
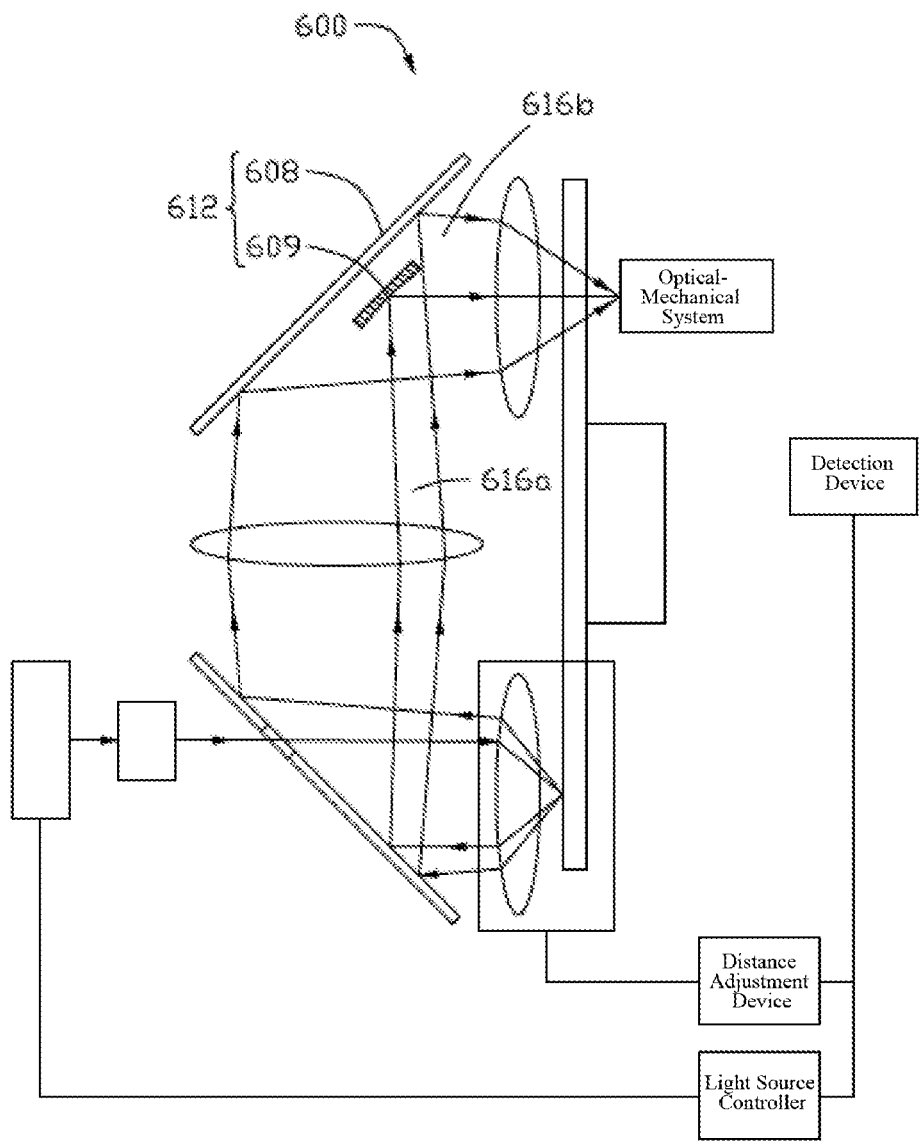
FIG. 15 is a structural schematic diagram of a light source system according to a sixth embodiment of the present disclosure.

Referring to FIG. 15, FIG. 15 is a structural schematic diagram of a light source system 600 according to a sixth embodiment of the present disclosure. The light source system 600 is substantially identical in structure to the light source system 500 of the fifth embodiment. That is, the above description of the light source system 500 can be basically applied to the light source system 600, and the difference between the two mainly lies in that a mirror 609 of a guiding device 612 is different. Specifically, in the present embodiment, a reflective surface of the mirror 609 of the guiding device 612 is also a curved surface but it is a concave surface, and a position of the mirror 609 is also slightly different from that in the sixth embodiment. At least a portion of the excited light in the first light exiting channel 616a is transmitted to the light-splitting sheet 608 via the mirror 609, and the light-splitting sheet 608 transmits the at least portion of the excited light to the second light exiting channel 616b via the mirror 609.

Figure 16:
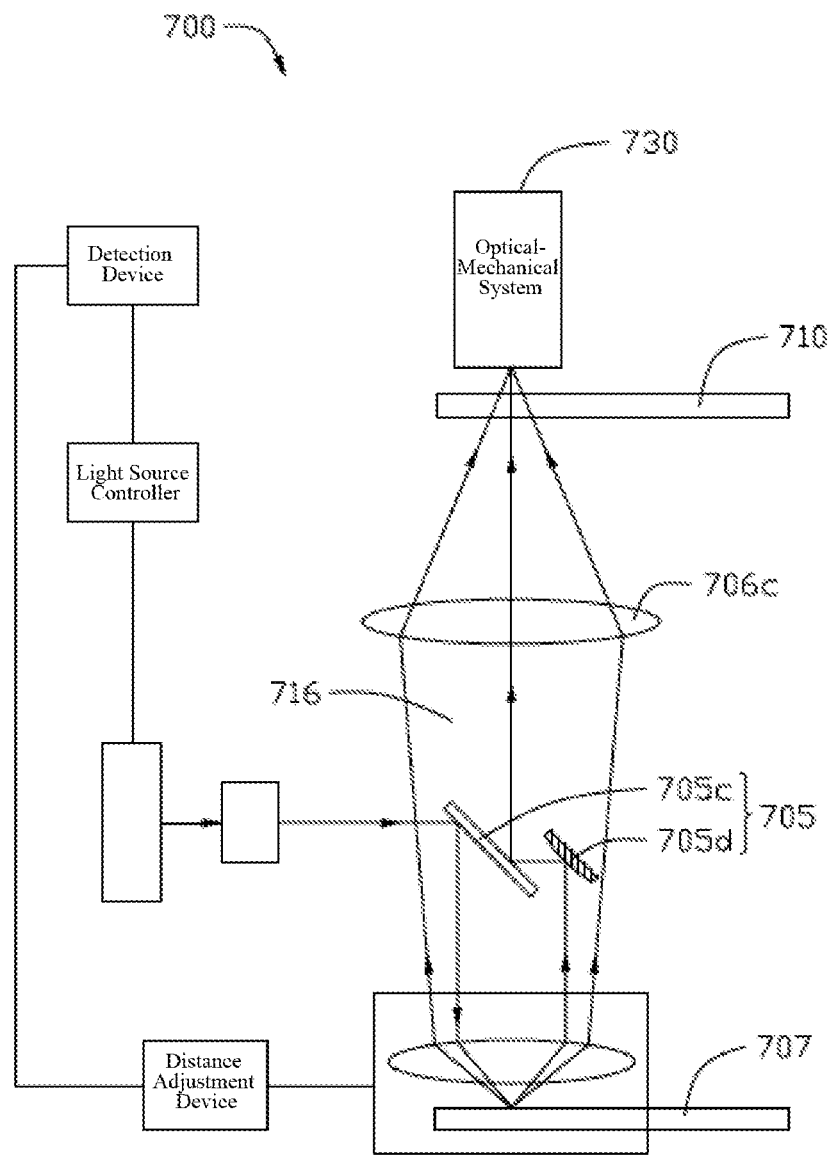
FIG. 16 is a structural schematic diagram of a light source system according to a seventh embodiment of the present disclosure.

Referring to FIG. 16, FIG. 16 is a structural schematic diagram of a light source system 700 according to a seventh embodiment of the present disclosure. The light source system 700 is substantially identical in structure to the light source system 200' of the second embodiment. That is, the above description of the light source system 200' can be basically applied to the light source system 700, and the difference between the two mainly lies in that structures of a wavelength conversion device 707, a region light-splitting device 705 of the relay system, and a scattering device 710 are different, so that a light exiting channel 716 is also slightly different.

Specifically, the region light-splitting device 705 includes a light-splitting sheet 705c and a mirror 705d. The light-splitting sheet 705c is disposed correspondingly to the first region, and the mirror 705d is disposed correspondingly to the second region. A first surface of the light-splitting sheet 705c of the first region receives the exciting light and reflects the exciting light to the wavelength conversion device 707. The wavelength conversion device 707 reflects a first portion of the exciting light to the mirror 705d of the second region, and the mirror 705d reflects the first portion of the exciting light to a second surface of the light-splitting sheet 705c of the first region opposite to the first surface. The second surface of the light-splitting sheet 705c of the first region reflects the first portion of the exciting light to a light exiting channel 716. The wavelength conversion device 707 also reflects the excited light to the light exiting channel 716. Further, the mirror 705d is also a curved mirror, which is a mirror whose reflective surface is a convex surface.

The scattering device 710 and the wavelength conversion device 707 are two individual elements arranged separately. The scattering device 710 is configured to receive the light of the light exiting channel 716 and provide scattered light to an entrance of an optical-mechanical system 730. A relay lens 706c is configured to collect light of the light exiting channel 716, such that the light of the light exiting channel 716 is imaged to the entrance of the optical-mechanical system 730 via the scattering device 710.

The principle and beneficial effects of the curved mirrors in the above embodiments are introduced below.

Specifically, as shown in the first embodiment, when a planar mirror 209 is used, since the wavelength of the exciting light is smaller than that of the excited light, its optical distance is relatively short, and the optical path of the excited light in the light source system 200 is relatively long, such that before the exciting light converges at the entrance of the optical-mechanical system 230 (such as the optical-mechanical square rod), the light spot of the exciting light at the entrance of the optical-mechanical system 230 is an out-of-focus image, which will affect the coupling efficiency and uniformity of the light source system 200.

Figure 17:
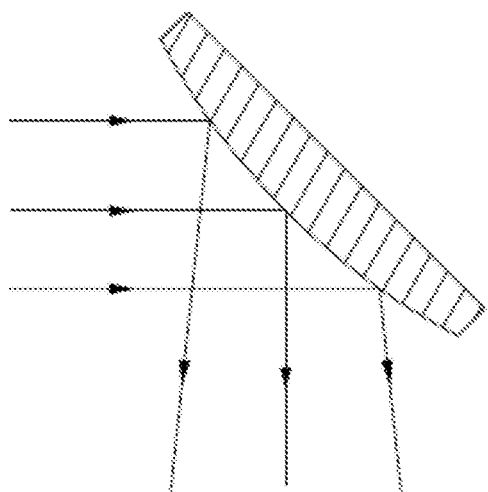
FIG. 17 is a schematic diagram illustrating principle of an optical path of a curved mirror.
Figure 17:
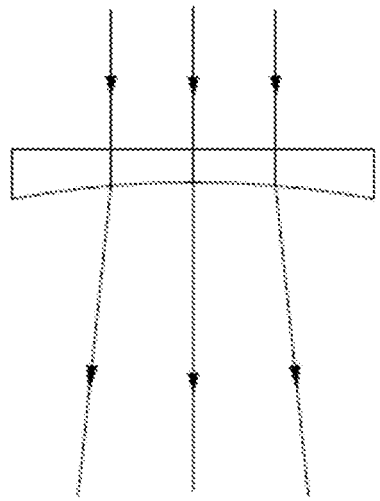
Figure 17:
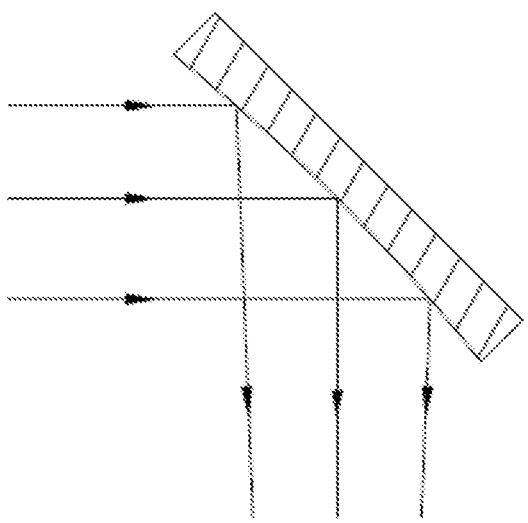
Figure 17:
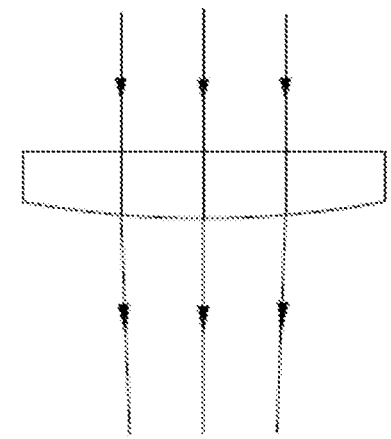

In the third, fourth, fifth, sixth and seventh embodiments, the curved mirrors 305d, 405d, 509, 609, 705d function similarly to lenses, participate in imaging, and can converge or diverge light. As shown in FIG. 17(A) (B), the concave mirrors 305d, 609 can converge the angle of the reflected light and have the same function as a convex lens; and as shown in FIG. 17 (C) (D), the convex mirrors 405d, 509, and 705d can diverge the angle of the reflected light and have the same function as a concave lens. Since the optical path of the exciting light is different from that of the excited light, the curved mirrors 305d, 405d, 509, 609, 705d can be used to reduce or increase the optical distance of the exciting light, in such a manner that both the exciting light and the excited light converge at the entrance of the light homogenizing device, thereby facilitating improving color uniformity.

Specifically, if in design of the optical path of the light source system, as shown in FIGS. 12, 13, and 16, the optical distance of the exciting light is longer than the optical distance of the excited light, then when the exciting light passes through the convex mirror, the reflected exciting light is diverged, so that the optical distance is extended during the imaging process, and thus it finally converges at the entrance of the light homogenizing device. In contrast, if in the design of the optical path of the light source system, as shown in FIGS. 14 and 15, the optical distance of the exciting light is shorter than the optical distance of the red and green light, then when the light beam passes through the concave mirror, the reflected light beam converges, so that the optical distance is reduced during the imaging process.

Since a difference between the optical distance of the exciting light and the optical distance of the excited light will not be too large, a required curvature is very small. In particular, in FIG. 15, the wavelength of the exciting light is relatively short, and its optical distance is shorter than that of the excited light, so the curvature required for the concave mirror here will be relatively small. The curvature depends on the difference between the optical distance of the exciting light and the optical distance of the excited light, and the larger difference requires for the larger curvature. Since the mirror is an intermediate element for imaging, its curvature can be optimized by software simulation, and a range of a radius of curvature is approximately from 50 to 500 (curvature=1/radius of curvature).

The present disclosure further provides a display device. The display device can be applied to a projector, an LCD (Liquid Crystal Display) display, and the like. The display device may include a light source system, a spatial light modulator, and a projection lens. The light source system employs the light source devices 200, 200', 300, 400, 500, 600, and 700 in the above embodiments. The spatial light modulator is configured to modulate an image and output image light according to the light emitted by the light source system and the input image data, and the projection lens is configured to perform projection according to the image light so as to display a projection image. The display device using the above light source devices 200, 200', 300, 400, 500, 600, and 700 has a high light utilization rate and a better color uniformity of an image.

In addition, it can be understood that the light source devices 200, 200', 300, 400, 500, 600, and 700 of the present disclosure can also be used for a stage light system, an in-vehicle lighting system, a surgical lighting system, etc., but not limited to the above display devices.

The above is only embodiments of the present disclosure and is not intended to limit the scope of the disclosure. All the equivalent structure or equivalent process transformation made according to the specification and the drawings of the present disclosure or those directly or indirectly applied to other related technical field are equally included in the patent scope of the present disclosure.

What is claimed is:

1. A light source system, comprising an exciting light source, a collection system, a wavelength conversion device, a relay system, an optical-mechanical system, a detection device, and a distance adjustment device, wherein:
   the exciting light source is configured to emit exciting light;
   the collection system is disposed between the exciting light source and the wavelength conversion device; and the exciting light irradiates the wavelength conversion device after being collected by the collection system;
   the wavelength conversion device comprises a conversion region and a reflective region, wherein the wavelength conversion device periodically moves in such a manner that the conversion region and the reflective region are periodically located on an optical path of the exciting light in different time divisions, wherein the conversion region is configured to convert the exciting light into excited light and emit the exited light, and the reflective region is configured to emit the exciting light by reflecting the exciting light, and wherein the excited light and the exciting light that are emitted from the wavelength conversion device are located on a same side of the wavelength conversion device but have optical axes that do not coincide;
   the collection system is further configured to collect the excited light and the exciting light that are emitted from the wavelength conversion device;
   the relay system is configured to guide the collected excited light and exciting light to the optical-mechanical system in such a manner that the excited light and the exciting light enter the optical-mechanical system with their optical axes being substantially coincident within a preset error range;
   the optical-mechanical system is configured to homogenize and provide the excited light and the exciting light to a spatial light modulator for modulating image light;
   as a distance between the collection system and the wavelength conversion device changes, brightness and color coordinates of light emitted from the optical-mechanical system change;
   the detection device is configured to detect information on the brightness and/or the color coordinates of the light emitted from the optical-mechanical system; and
   the distance adjustment device is configured to adjust the distance between the collection system and the wavelength conversion device in accordance with the information detected by the detection device in such a manner that the brightness and/or the color coordinates of the light emitted from the optical-mechanical system satisfy a preset condition.

2. The light source system according to claim 1, wherein:
   the detection device is configured to detect brightness of the excited light, the exciting light or mixed light of the excited light and the exciting light that are emitted from the optical-mechanical system; and
   the distance adjustment device adjusts the distance between the collection system and the wavelength conversion device to a distance corresponding to maximum brightness detected by the detection device.

3. The light source system according to claim 1, wherein:
   the detection device is configured to detect color coordinates and brightness of mixed light of the excited light and the exciting light that are emitted from the optical-mechanical system;
   the distance adjustment device is further configured to adjust the distance between the collection system and the wavelength conversion device in accordance with the color coordinates detected by the detection device in such a manner that the color coordinates detected by the detection device reach target color coordinates; and
   the light source system further comprises:
   a light source controller configured to adjust intensity of the exciting light emitted by the exciting light source in accordance with the brightness detected by the detection device in such a manner that the brightness detected by the detection device reaches target brightness.

4. The light source system according to claim 3, wherein when the color coordinates detected by the detection device are larger than the target color coordinates, the distance adjustment device reduces the distance between the wavelength conversion device and the collection system; and when the color coordinates detected by the detection device are smaller than the target color coordinates, the distance adjustment device increases the distance between the wavelength conversion device and the collection system.

5. The light source system according to claim 3, wherein when the brightness detected by the detection device is larger than the target brightness, the light source controller reduces a driving current of the exciting light source; and when the brightness detected by the detection device is smaller than the target brightness, the light source controller increases the driving current of the exciting light source.

6. The light source system according to claim 1, wherein the optical-mechanical system comprises a light homogenizing device, a first stop, a second stop, a third stop, a first relay lens, and a second relay lens, the first stop is disposed at an entrance of the light homogenizing device, the excited light and the exciting light that are emitted from the relay system are incident to the light homogenizing device via the first stop, the first relay lens is disposed between the light homogenizing device and the second stop, and the second relay lens is disposed between the second stop and the third stop.

7. The light source system according to claim 1, wherein the relay system comprises a region light-splitting device located between the collection system and the exciting light source and comprising a first region and a second region,
   wherein the first region of the region light-splitting device guides the exciting light emitted by the exciting light source to the collection system, such that the exciting light is guided to the wavelength conversion device after being collected by the collection system, the exciting light comprising a first portion of the exciting light incident to the reflective region and a second portion of the exciting light incident to the conversion region, wherein the first portion of the exciting light and the second portion of the exciting light are periodically incident to the reflective region and the conversion region in different time divisions;

wherein the first portion of the exciting light is reflected to the collection system by the reflective region and guided to the second region of the region light-splitting device after being collected by the collection system, wherein the second region of the region light-splitting device is configured to guide the first portion of the exciting light to a light exiting channel; and wherein the conversion region converts the second portion of the exciting light into excited light and reflects the excited light to the collection system which collects the excited light, and the collected excited light is further guided to the light exiting channel.

8. The light source system according to claim 7, wherein the exciting light is obliquely incident to the reflective region at a preset angle, such that the optical axes of the excited light and the exciting light that are emitted from the wavelength conversion device do not coincide.

9. The light source system according to claim 7, wherein the relay system further comprises a guiding device, the light exiting channel comprises a first light exiting channel and a second light exiting channel, the region light-splitting device guides light emitted from the wavelength conversion device to the guiding device via the first light exiting channel, and the guiding device guides light in the first light exiting channel to the second light exiting channel.

10. The light source system according to claim 9, wherein the relay system comprises a light-splitting sheet which receives the excited light emitted via the first light exiting channel from the region light-splitting device and reflects the excited light to the second light exiting channel and a mirror which receives the first portion of the exciting light emitted via the first light exiting channel from the region light-splitting device and reflects the first portion of the exciting light to the second light exiting channel.

11. The light source system according to claim 10, wherein a reflective surface of the mirror is a convex surface, the light-splitting sheet transmits the first portion of the exciting light in the first light exiting channel to the mirror, the mirror reflects the first portion of the exciting light, and the first portion of the exciting light is transmitted to the second light exiting channel through the light-splitting sheet.

12. The light source system according to claim 10, wherein a reflective surface of the mirror is a concave surface, at least a portion of the excited light in the first light exiting channel is transmitted to the light-splitting sheet through the mirror, and the light-splitting sheet transmits at least the portion of the excited light to the second light exiting channel through the mirror.

13. The light source system according to claim 7, wherein the relay system further comprises a scattering device configured to receive and scatter light emitted from the light exiting channel, and the scattered light is guided to the optical-mechanical system.

14. The light source system according to claim 13, wherein the scattering device comprises a scattering region configured to scatter the exciting light emitted from the light exiting channel and a filtering region configured to filter the excited light emitted from the light exiting channel, wherein the scattering region and the filtering region are disposed in a circumferential direction; the scattering device and the wavelength conversion device are formed into one piece, and the scattering region and the filtering region are located inside the reflective region and the conversion region.

15. The light source system according to claim 7, wherein the region light-splitting device comprises a light-splitting sheet which is disposed correspondingly to the first region and a mirror which is disposed correspondingly to the second region, wherein a first surface of the light-splitting sheet of the first region receives the exciting light and reflects the exciting light to the wavelength conversion device, the wavelength conversion device reflects the first portion of the exciting light to the mirror of the second region, the mirror reflects the first portion of the exciting light to a second surface of the light-splitting sheet of the first region opposite to the first surface, the second surface of the light-splitting sheet of the first region reflects the first portion of the exciting light to the light exiting channel, and the wavelength conversion device further reflects the excited light to the light exiting channel.

16. The light source system according to claim 15, wherein a reflective surface of the mirror is convex surface.

17. The light source system according to claim 7, wherein the region light-splitting device further comprises a third region located at periphery of the first region and the second region, wherein the region light-splitting device comprises a light-splitting sheet which is disposed correspondingly to the first region, the second region and the third region and a mirror which is disposed correspondingly to the second region, wherein a portion of the light-splitting sheet at the first region receives the exciting light and transmits the exciting light to the wavelength conversion device, the wavelength conversion device reflects the first portion of the exciting light to the mirror, the mirror of the second region reflects the first portion of the exciting light to the light exiting channel, and the light-splitting sheet further reflects the excited light to the light exiting channel.

18. The light source system according to claim 17, wherein a reflective surface of the mirror is a convex surface, the wavelength conversion device reflects the first portion of the exciting light to the mirror via the light-splitting sheet, and the first portion of the exciting light reflected by the mirror enters the light exiting channel via the light-splitting sheet.

19. The light source system according to claim 17, wherein a reflective surface of the mirror is a concave surface, and at least a portion of the excited light is transmitted through the mirror to the light-splitting sheet, such that the light-splitting sheet reflects the excited light emitted from the wavelength conversion device to the light exiting channel.

20. The light source system according to claim 1, wherein the relay system comprises:
 a light-splitting sheet configured to transmit the exciting light and reflect the excited light; and,
 a mirror configured to reflect the excited light emitted from the wavelength conversion device.

21. The light source system according to claim 20, wherein the mirror is configured to guide the exciting light collected by the collection system in such a manner that the optical axis of the exciting light and an optical axis of the excited light reflect by the mirror are substantially coincident within the preset error range.

22. The light source system according to claim 21, wherein the mirror is located at a side of the light-splitting sheet far away from the wavelength conversion device and configured to reflect exciting light that is emitted from the wavelength conversion device after transmitting through the light-splitting sheet.

23. A display device, comprising a light source system, wherein the light source system comprises an exciting light source, a collection system, a wavelength conversion device, a relay system, an optical-mechanical system, a detection device, and a distance adjustment device, wherein:

the exciting light source is configured to emit exciting light;

the collection system is disposed between the exciting light source and the wavelength conversion device; and the exciting light irradiates the wavelength conversion device after being collected by the collection system;

the wavelength conversion device comprises a conversion region and a reflective region, wherein the wavelength conversion device periodically moves in such a manner that the conversion region and the reflective region are periodically located on an optical path of the exciting light in different time divisions, wherein the conversion region is configured to convert the exciting light into excited light and emit the exited light, and the reflective region is configured to emit the exciting light by reflecting the exciting light, and wherein the excited light and the exciting light that are emitted from the wavelength conversion device are located on a same side of the wavelength conversion device but have optical axes that do not coincide;

the collection system is further configured to collect the excited light and the exciting light that are emitted from the wavelength conversion device;

the relay system is configured to guide the collected excited light and exciting light to the optical-mechanical system in such a manner that the excited light and the exciting light enter the optical-mechanical system with their optical axes being substantially coincident within a preset error range;

the optical-mechanical system is configured to homogenize and provide the excited light and the exciting light to a spatial light modulator for modulating image light;

as a distance between the collection system and the wavelength conversion device changes, brightness and color coordinates of light emitted from the optical-mechanical system change;

the detection device is configured to detect information on the brightness and/or the color coordinates of the light emitted from the optical-mechanical system; and the distance adjustment device is configured to adjust the distance between the collection system and the wavelength conversion device in accordance with the information detected by the detection device in such a manner that the brightness and/or the color coordinates of the light emitted from the optical-mechanical system satisfy a preset condition.

\* \* \* \* \*